US007721962B2

(12) United States Patent
Moon

(10) Patent No.: US 7,721,962 B2
(45) Date of Patent: May 25, 2010

(54) REMOVABLE MEMORY CARD BRIDGE

(75) Inventor: Sung Ub Moon, Richmond (CA)

(73) Assignee: Saun & Moon Holding Company Limited, Richmond, BC (CA)

( * ) Notice: Subject to any disclaimer, the term of this patent is extended or adjusted under 35 U.S.C. 154(b) by 424 days.

(21) Appl. No.: 11/983,523

(22) Filed: Nov. 8, 2007

(65) Prior Publication Data

US 2008/0135616 A1 Jun. 12, 2008

Related U.S. Application Data

(63) Continuation-in-part of application No. PCT/CA2007/000783, filed on May 4, 2007.

(60) Provisional application No. 60/798,322, filed on May 8, 2006.

(51) Int. Cl.
*G06K 7/06* (2006.01)

(52) U.S. Cl. ...................................................... 235/441

(58) Field of Classification Search ................. 235/441, 235/492, 451
See application file for complete search history.

(56) References Cited

U.S. PATENT DOCUMENTS 5,266,903 A 11/1993 Foster
6,416,342 B2 7/2002 Matsumura
7,152,801 B2 12/2006 Cuellar et al.
2003/0052168 A1* 3/2003 Wong ......................... 235/451
2003/0057278 A1* 3/2003 Wong ......................... 235/451
2010/0049878 A1* 2/2010 Yu et al. ....................... 710/11

FOREIGN PATENT DOCUMENTS

JP 03141486 A2 6/1991

OTHER PUBLICATIONS

Written Opinion of International Searching Authority; International Application No. PCT/CA2007/000783; Sep. 6, 2007.

* cited by examiner

*Primary Examiner*—Allyson N Trail
(74) *Attorney, Agent, or Firm*—Klarquist Sparkman, LLP

(57) ABSTRACT

A memory card reader system includes bridges interposed between a memory card of a certain type and a memory card reader receiver which is them same for all receivers. The bridge may have the same or different contact patterns of a standard of a type of memory card and is readily removable and replaceable in order to change the type of memory card that may be used with that connector of the reader. A face plate prevents removal of a bridge until the face plate is moved from a normal position.

20 Claims, 19 Drawing Sheets

REMOVABLE MEMORY CARD BRIDGE

CROSS REFERENCES TO RELATED APPLICATIONS

This application is a Continuation-in-Part of International Application PCT/CA2007/000783 filed May 4, 2007, which claims the benefit of U.S. Provisional Patent Application Ser. No. 60/798,322, filed May 8, 2006.

BACKGROUND OF THE INVENTION

1. Field of the Invention

This invention relates to improvements to a storage card (memory card) reader system, and more particularly relates to a readily replaceable and exchangeable memory card bridge for insertion in the receiver of the reader to protect it from damage and to provide easy replacement and/or substitution of memory card bridges to accommodate different types of memory cards.

2. Background

Storage cards (sometimes referred to as memory cards or data storage devices) are increasingly popular as an electronic storage medium in various devices. They are used both to store data and also to transfer the data to other devices. These storage cards may be read and written to by card readers having receivers or connectors that are configured to be compatible with a specific type of storage card. Card readers can be contained within digital cameras, desktop computers, notebook computers, video cameras, televisions, and various audio and video players; virtually any modern electronic devices which utilizes a removable storage system for storing data for which a compact size is advantageous.

Currently there are many types of storage cards available on the market such as a PCMCIA Card, Compact Flash Card (CF card), Smart Media Card (SM Card), Memory Stick (MS card), Memory Stick Duo (MS Duo Card), Memory Stick Micro, Multimedia Card (MMC), Reduced-Size Multimedia Card (RS-MMC), Multimedia Micro Card (MMC micro), Secure Digital Card (SD card), mini Secure Digital Card (mini SD card), micro Secure Digital Card (micro SD card), xD-Picture Card (xD card) and so on. Further types of storage cards may be developed in the future.

As a consequence many different kinds of card readers are required, each configured to read a specific type or types of storage card as most of these storage cards are incompatible with each other having receivers (or input ports) for receiving a storage card of one type, or perhaps several types, of storage cards. These card readers may be internal and external and either accept only one type of storage card or several types of storage cards. As these card readers are sensitive electronic devices they are prone to damage or inoperability due to excessive or careless use by users. This is particularly so considering that these card readers are often used with portable devices due to the small size of the storage cards. Those portable devices are often more prone to be handled roughly, dropped or otherwise damaged through use.

As there are many types of storage cards, when a user moves data from one device to another device using a storage card, the user may become confused. Furthermore users can have difficulty in locating a correct card reader compatible with the type of storage card containing the data to be transferred. In order to overcome this problem many card readers include several individual card readers as a multiple system in order to accept and read (or write to) different types of storage cards using that card reader.

In many cases an individual user will prefer one or perhaps two types of storage cards for that individual's storage needs. That user will make use of only one or two slots and corresponding connectors (sometimes called receivers) in a multiple card reader system. The other slots and connectors of that user's card reader will remain unused or little used. As a consequence only one or two connectors of the card reader will become worn out, damaged or unusable through repeated use or misuse, leaving the other connectors of the system undamaged and usable. The user is forced to either replace the card reader in its entirety, which is unnecessarily expensive given the number of usable components that must be discarded, or if he is technically astute, remove and replace only the damaged or inoperable connector of the card reader, a process requiring considerable skill and time. Either method is unsatisfactory. If the damaged or inoperable connector could be easily and cheaply replaced with a new connector by an unskilled individual, significant time and expense could be saved.

In another situation, in the event of failure of the card reader embedded in an expensive electronic device, such as a digital camera, the entire camera must usually be replaced as the cost of repair can often approach or exceed the cost of replacement. If the receiver (connector) of the card reader of digital camera could be easily and cheaply replaced with a new connector, then a user would not need to waste money by purchasing a new digital camera or undertaking expensive repairs.

These types of card readers are also embedded in many types of self-standing user activated commercial stations such as kiosks and the like. This can include photo kiosks, banking kiosks, payment kiosks and so on. Generally the kiosk itself is expensive as it contains many complex and expensive electronic components to provide relevant services or products to a user. They are not easily removed for repair or maintenance and when they are removed the service or products are unavailable to the user. This adversely impacts the commercial enterprise that is using the kiosk to service its customers, both in foregoing income from the kiosk and in customer dissatisfaction when attending the premises of the commercial enterprise only to find that the kiosk has been removed for repair or is inoperable. A damaged or inoperable receiver (connector) of a card reader in a kiosk can result in the inoperability of the kiosk, or at least inoperability by users with storage cards compatible with the inoperable connector. If the defective receiver (connector) of the card reader of a kiosk could be easily and cheaply replaced with a new receiver (connector), these problems could be overcome.

In all of these situations the replacement of the damaged receiver (connector) of the card reader is a difficult, expensive and time consuming task which must be undertaken by trained individuals.

In typical memory card readers having multiple inputs the type of memory card is predetermined for each input slot in the reader. Because each receiver is fixed within the reader it is not possible to easily and cheaply replace an input slot of one type of memory card with that compatible with another type of memory card. This makes it difficult for users to change the type of memory card receiver in order to change the type of memory card which can be used with a particular reader, as for example, when a user purchases a new electronic device that uses a memory card that is incompatible with that previously used and for which the reader has no compatible receiver. In addition a user may wish to change the particular order of the compatible types of receivers within the reader or may chose to have multiple receivers that are compatible with the same type of memory card, in order to accommodate several memory cards of the same type simultaneously.

This is not readily possible with traditional memory card readers as they have fixed receivers of a particular type and are also not configured in a manner which addresses the differences in size of each type of memory card.

If a purchaser desires a pre-configured card reader with 6 slots (for example, SD, CF, MS, SM, xD, MMC slots) as manufactured in accordance with the prior art, the manufacturer would manufacture a card reader with slots in the desired position fixed to the integrated circuit board in a manner which is substantially permanent, that is changes would be undertaken with considerable difficulty. However, if a user would like to have a different card reader (for example SD, MS, SM, CF, xD, MMC), the manufacturer would have to redesign the card reader to provide these alternate fixed positions. At that time, significant design cost and manufacturing cost would be required. This embodiment of the invented card reader does not need to be redesigned in this manner. If the sequence of slots is to be changed, the manufacturer can accomplish this quickly and cheaply by changing the bridge. Only the face plate needs to be changed in accordance with the sequence of desired slots.

Also, if a new type of memory card is introduced into the market, the manufacturer can readily design a new card reader to accommodate the new type of memory card. The prior art card reader discussed above will require significant design cost and manufacturing cost to accommodate a new type of memory card. And in some cases, the actual system containing the old card reader must be replaced. In that case, the replacement cost would be significant. However, this embodiment of the invented card reader only requires a change of the bridge and face plate to adapt the reader to a new type of memory card. For example, if a new type of mini-SD card is introduced into the market, the invented card reader requires only a newly designed bridge accommodating the new style mini-SD card in order to function with the existing invented card reader. The design and manufacturing costs of the bridge would be far less than the cost of redesigning and replacing the entire card reader. If this invented card reader is in use by a purchaser, then a newly designed memory card bridge accommodating the new type of mini-SD card could be provided to the user to insert into an available slot of the invented card reader. A replacement face plate with an appropriate slot for the new type of mini-SD card could also be provided. The replacement of the entire card reader system is not required in order to accommodate the new type of memory card, the only required change is the addition or replacement with the new bridge and the possible change of the face plate. The results in significant cost savings at the manufacturing stage as well as for users wishing to upgrade.

SUMMARY OF THE INVENTION

Applicant has developed a card bridge and card reader system and method which may be employed to address these serious problems.

In an aspect of the invention a memory card bridge for connecting a memory card to a memory card receiver of a memory card reading device; the bridge includes a card receiving section configured to receive and operatively connect to a pre-determined type of memory card for transmitting data from and to the memory card; a receiver insertion section connectable to the memory card receiver configured to operatively connect to a predetermined type of memory card receiver for transferring data between the memory card and the receiver, the predetermined type of receiver configured to operatively connect to the said predetermined type of memory card; the card receiving section is operatively connected to the receiver insertion section so that when the type of memory card is operatively inserted in the card receiving section and when the receiver insertion section is operatively connected to the receiver, data may be transmitted between the memory card and the receiver, and the card receiving section comprises a housing with an opening dimensioned to receive the type of memory card for operative connection to the card receiving section for transmission of data between the memory card and the receiver wherein the housing comprises upper and lower planar members connected by opposed sides all dimensioned to provide a guide to ensure proper insertion of the memory card into the card receiving section and operative connection between the memory card and the card receiving section.

Alternatively the receiver comprises an opening dimensioned to receive the type of memory card for operative connection of the receiver to a memory card of the type of memory card and wherein the card receiving section comprises an opening dimensioned to be identical to the opening of the receiver.

The housing length may be at least 50% of the length of the type of memory card.

The housing length may be approximately the length of the type of memory card such that when the memory card is operatively connected to the card receiving section the housing completely covers the memory card.

The type of memory card may be a connector dimensioned to operatively connect to the receiver and wherein the receiver insertion section is dimensioned to be identical to the dimensions of the connector.

The type of memory card may be a connector segment dimensioned to operatively connect to the opening of the receiver and wherein the receiver insertion section is dimensioned to be identical to the dimensions of the connector.

The receiver insertion section may be dimensioned for friction fit connection to the receiver.

Alternatively, the card receiving section includes a plurality of electrical contact connection members configured to match the electrical contact connectors of the type of memory card.

the receiver insertion section may include a plurality of electrical contact connection members configured to match the electrical contact connectors of the receiver.

In another aspect of the invention a memory card reader, includes a frame member comprising a removable face plate, the face plate including a face plate opening dimensioned to receive a pre-determined type of memory card; a memory card receiver configured to operatively connect to the predetermined type of memory card connected to the frame and aligned with the face plate opening for receiving the predetermined type of memory card through the opening and for transmitting data between the predetermined type of memory card and the receiver, the receiver spaced from the face plate a pre-determined distance. A memory card bridge includes: (i) a card receiving section configured to receive and operatively connect to the pre-determined type of memory card for transmitting data from and to the memory card; (i) a receiver insertion section connectable to the memory card receiver configured to operatively connect to the memory card receiver for transferring data between the memory card and the receiver; (ii) the card receiving section is operatively connected to the receiver insertion section so that when the type of memory card is operatively inserted in the card receiving section and when the receiver insertion section is operatively connected to the receiver, data may be transmitted between the memory card and the receiver, and (iii) the memory card bridge is dimensioned in length equivalent to the pre-determined distance so that when the receiver insertion section is operatively connected to the memory card receiver the opposite end of the memory card bridge is aligned on the side of the face plate facing the memory card receiver. In normal operation the memory card receiver is aligned with the face plate opening and the face plate is oriented with respect to the frame in a normal position which prevents the removal of the memory card bridge from the receiver and replacement with another like memory card bridge, and wherein such removal and replacement is permitted when the face plate is moved from its normal position.

Optionally, the receiver and face plate are oriented such that the outer end of the receiver is substantially co-planar with the face plate.

In a further aspect of the invention a reader for a plurality of data storage devices is provided including an integrated circuit board controlling the exchange of data from and to the data storage devices, the integrated circuit board having a front edge. A face plate communicating with the front edge of the circuit board having a plurality of openings to accept the data storage devices. A plurality of connectors connected to the circuit board each one spaced the same predetermined distance from the front edge, the connectors configured to operatively exchange data between any type of conventional memory card and the circuit board and having electrical contacts in a connector electrical contact pattern which is the same for each connector. A plurality of removable bridges, each includes (i) a data storage device receiving section adjacent a first end of each bridge configured to receive and operatively connect to a pre-determined type of data storage device having data storage device electrical contacts in a pattern of a contact standard of a type of data storage device so as to permit the exchange of data with the data storage device; (ii) a connector insertion section adjacent a second end of each bridge, opposite the first end, configured to operatively connect to any one of the plurality of connectors and having electrical contacts in an electrical contact pattern compatible with the connector electrical contact pattern so as to permit the exchange of data with the circuit board; and (iii) a series of electrical contacts connecting the electrical contacts of the data storage device receiving section and the electrical contacts of the connector insertion section. The distance between the first end and the second end of each bridge is substantially equal to the pre-determined distance so that when the connector insertion section of a bridge is operatively connected to a connector the data storage device receiving section of the bridge is positioned adjacent the face plate.

As an alternative, when in normal operation the face plate is oriented with respect to the circuit board in a normal position which prevents the removal of the bridge from the connector and replacement with another bridge, and wherein such removal and replacement is permitted when the face plate is moved from its normal position to an open position.

The bridge may also include an integrated circuit for converting data transmitted between the data storage device receiving section and the connector insertion section to a form which permits exchange of data between the data storage device and the integrated circuit board of the reader.

As a further alternative the connector electrical contact pattern is not compatible with a pattern of a contact standard of a type of data storage device.

Alternatively the data storage device receiving sections of more than one of the bridges have an identical data storage device electrical contact patterns.

Optionally, the data storage device receiving sections of more than one of the bridges have different data storage device electrical contact patterns.

As a further alternative the data storage device receiving section may include a housing with an opening dimensioned to receive the type of memory card for operative connection to the data storage device receiving section for transmission of data between the data storage device and the receiver wherein the housing comprises upper and lower planar members connected by opposed sides all dimensioned to provide a guide to ensure proper insertion of the data storage device into the data storage device receiving section and operative connection between the data storage device and the data storage device receiving section.

As another alternative the plurality of openings are uniform in size and dimensioned to accept any type of data storage device.

By employing such a reader system users can readily remove the face plate thereby permitting access to and removal of a bridge compatible with a particular type of data storage device and replace it with a bridge compatible with a data storage device of another type. Users can use a variety of bridges compatible with desired data storage devices, which will all fit into a receiver that is the same for all types of bridges of the system. The distance between the face plate and the receivers is the same, consistent with the length of the bridge. In an alternate embodiment this is a length which can accommodate the largest in length of data storage device either preferred by a manufacturer or customers or which are in use in the market. The face plate prevents removal of a bridge, until and unless the face plate is moved (or removed) in a manner which permits the removal and substitution of another bridge. Such a bridge has the added advantage of being easily replaced by a like compatible bridge when an existing bridge is worn out due to repeated or improper use.

DETAILED DESCRIPTION

In an embodiment, the presented invention generally provides an improvement to card reader system by adding a card bridge between a storage or memory card and the connector or receiver of a memory card reader.

The addition of a bridge will significantly improve the reliability, reparability, and life cycle of any electronic device which utilizes a card reader. This improvement makes the maintenance of these devices much cheaper and simpler to the benefit of manufacturers, assemblers, distributors, service companies and users of these devices.

Figure 1:
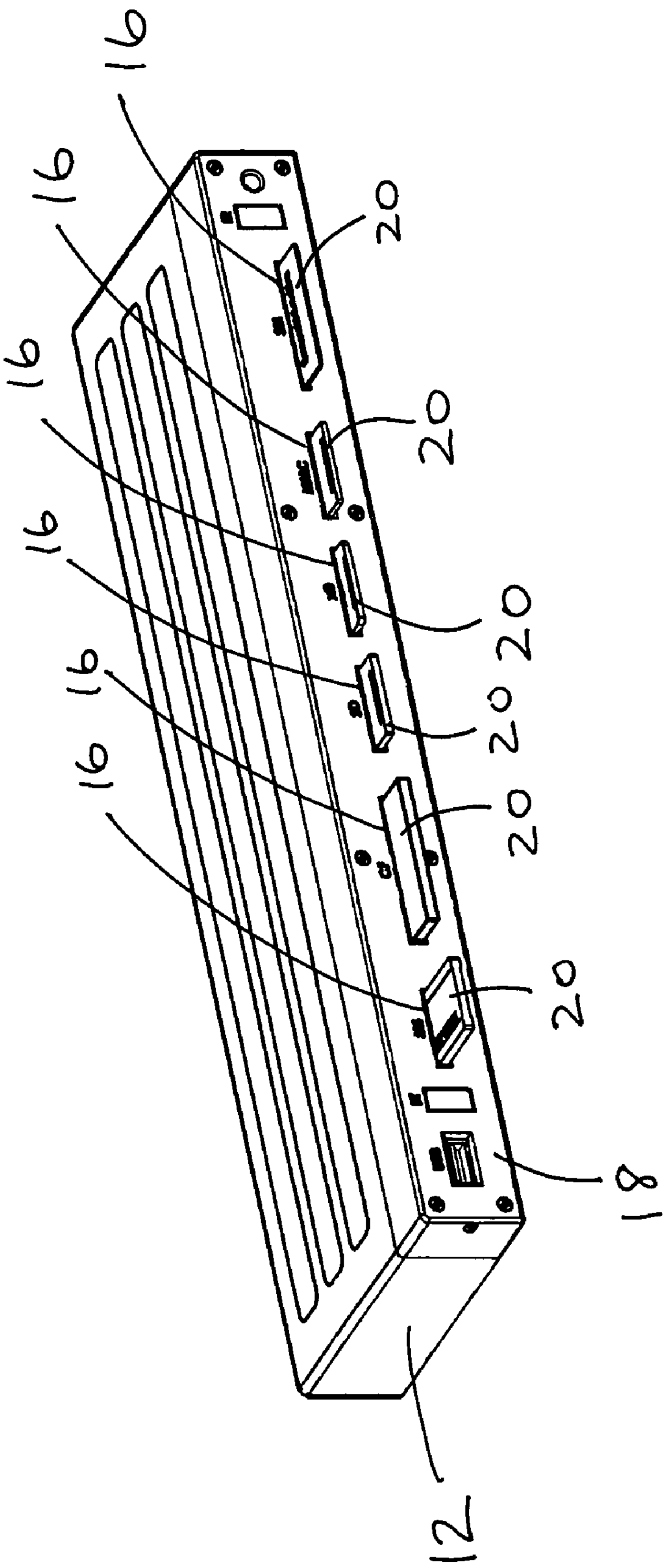
FIG. 1 is a front perspective view depicting a memory card reader having multiple receivers each configured to read and write to a specific type of memory card. The specific type of memory card for each such receiver is shown inserted into the corresponding receiver.

FIG. 1 depicts memory card reader 12 which includes various types of individual receivers 14 with compatible storage cards 20 inserted directly into each receiver 14 through the corresponding housing slot 16 of the bezel or plate member 18. It should be understood that this is one example of a card reader 12. Card reader 12 may be internal or external, some can read different types of storage cards 20 (as depicted in FIG. 1) and some can only read one type of storage card 20. Card readers 12 can be embedded in various electronic devices such as digital cameras, computers, cell phones, video cameras, printers, scanners, PDA's, handheld computers, Notebook PC's, MP3 players, game machines, televisions, and so on, whether internally or externally. Card readers are also often included with commercial stations containing computing systems such as kiosks and the like.

FIG. 1 depicts several types of storage cards 20 with corresponding receivers 14 for each of those cards 20. The types of storage cards 20 include (but are not limited to) PCMCIA Cards, Compact Flash Cards (CF cards), Smart Media Cards (SM Cards), Memory Sticks (MS cards), Memory Stick Duo (MS Duo Cards), Memory Stick Micro, Multimedia Cards (MMC), Reduced-Size Multimedia Cards (RS-MMC), Multimedia Micro Cards (MMC micro), Secure Digital Cards (SD cards), mini Secure Digital Cards (mini SD cards), micro Secure Digital Cards (micro SD cards), xD-Picture Cards (xD cards). Further types of storage cards 20, with corresponding receivers 14, may be developed in the future and this invention would be equally applicable to those storage cards 20 and receivers 14, through appropriate configuration of the bridge as will become apparent.

Figure 2:
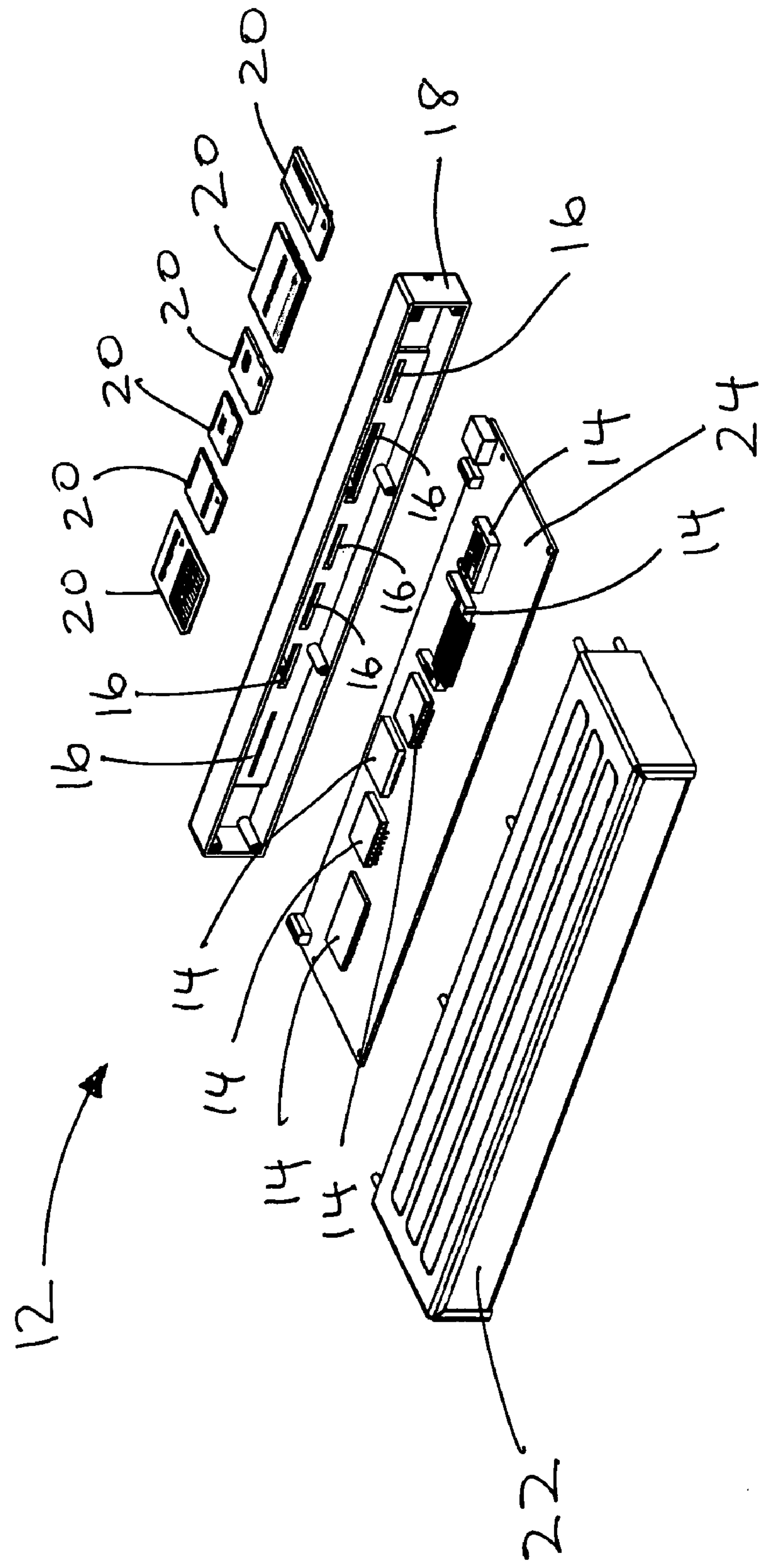
FIG. 2 is a rear exploded view of a memory card reader having multiple receivers each configured to read and write to a specific type of memory card. The specific type of memory card for each such receiver is shown separately, aligned with the corresponding receiver.

FIG. 2 is an exploded view of memory card reader 12 of FIG. 1 having multiple receivers 14 each configured to read and write to a specific type of memory card 20. The specific type of memory card 20 for each such receiver 14 is shown separately, aligned with its corresponding receiver 14.

The basic internal structure of a typical card reader includes housing 22, a PCB (printed circuit board) 24 with receivers 14 operatively connected thereto. Printed circuit board 24 contains the necessary electronic components and circuitry to read and write to memory cards 20 when inserted into corresponding receivers 14. A face plate 18 (sometimes called a plate member) contains a plurality of slots 16 (sometimes called openings). Users may insert a storage card 20 (sometime called a memory card, smart card and so on) through slot 16 in face plate 18 to connect storage card 20 with the corresponding receiver 14 on the printed circuit board 24.

As there are many types of storage cards 20, users sometimes mishandle the card reader 12 by attempting to force the wrong storage card 20 into a receiver 14 not configured to accept that type of storage card 20. Users may also cause damage to the receiver 14 by improperly inserting a storage card 20 into a receiver 14 which is properly configured for that type of storage card 20. Receivers 14 may also be damaged or rendered unusable through normal "wear and tear", that is through repeated use which eventually wears out the components of receiver 14, including through abrasion of the internal parts of receiver 14. This occurs despite the best efforts of manufacturers to minimise the occurrence of misuse and the effects of misuse as well as damage resulting from normal wear and tear on receiver 14. These problems can cause receiver 14 to malfunction rendering that receiver 14 unavailable for use in reading and writing to storage cards 20. In most cases the problems associated with the misuse and wear and tear occur at the receiver 14 which, absent the subject invention, is in direct contact with a storage card 20.

Often the malfunction or inability to function of receiver 14 of card reader 12 requires either the replacement of the entire device associated with that card reader (for example a kiosk, computer, digital camera, etc.) or expensive repairs requiring the expertise of a specialized technician to remove the inoperable or malfunctioning receiver 14 and replacing it with a new receiver 14. This is an expensive and time consuming process.

The card bridge of Applicant's invention, described below, is interposed between the storage card 20 and receiver 14 and is replaceable cheaply and easily by a person with little technical expertise. By replacing a defective bridge of applicant's invention, rather than receiver 14, that replacement can be undertaken at significantly reduced cost, both in component costs and the time cost of an experienced technician. This can be undertaken on-site without removal of the device to a repair centre and with minimal disruption to the use of the device.

Figure 3:
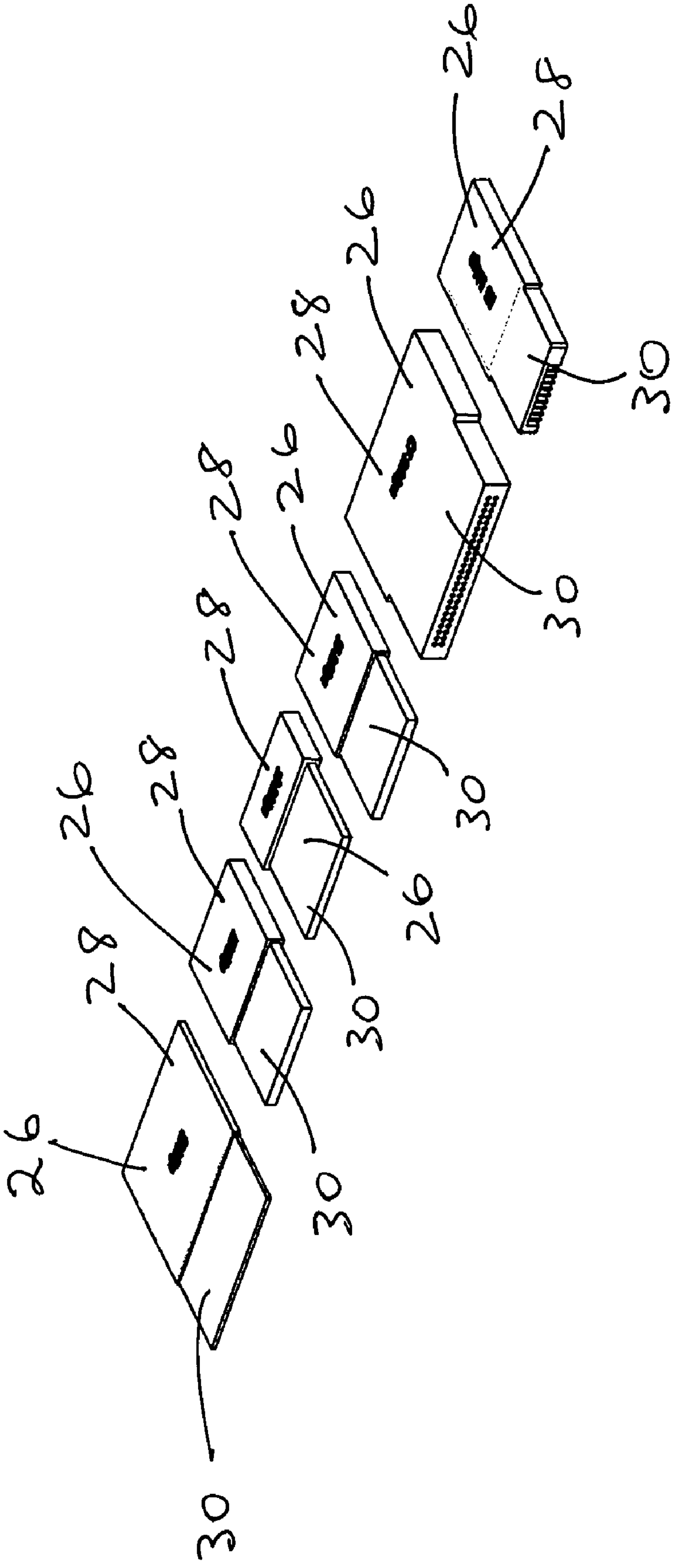
FIG. 3 depicts several types of card bridges configured for use with corresponding separate types of memory cards and associated receivers.

FIG. 3 depicts several types of memory card bridges 26 of the subject invention, configured for different types of storage cards 20 and associated receivers 14 (FIGS. 1 and 2). The shape, size and type could be modified depend on the configuration of a particular storage card 20 and its associated receiver 14.

Each bridge 26 includes a storage card receiving section 28 for operatively receiving a memory card 20 of the type associated with that particular bridge 26. Each bridge 26 further includes a receiver insertion section 30 for operatively inserting into a receiver 14 of the type associated with that particular bridge 26.

Figure 4:
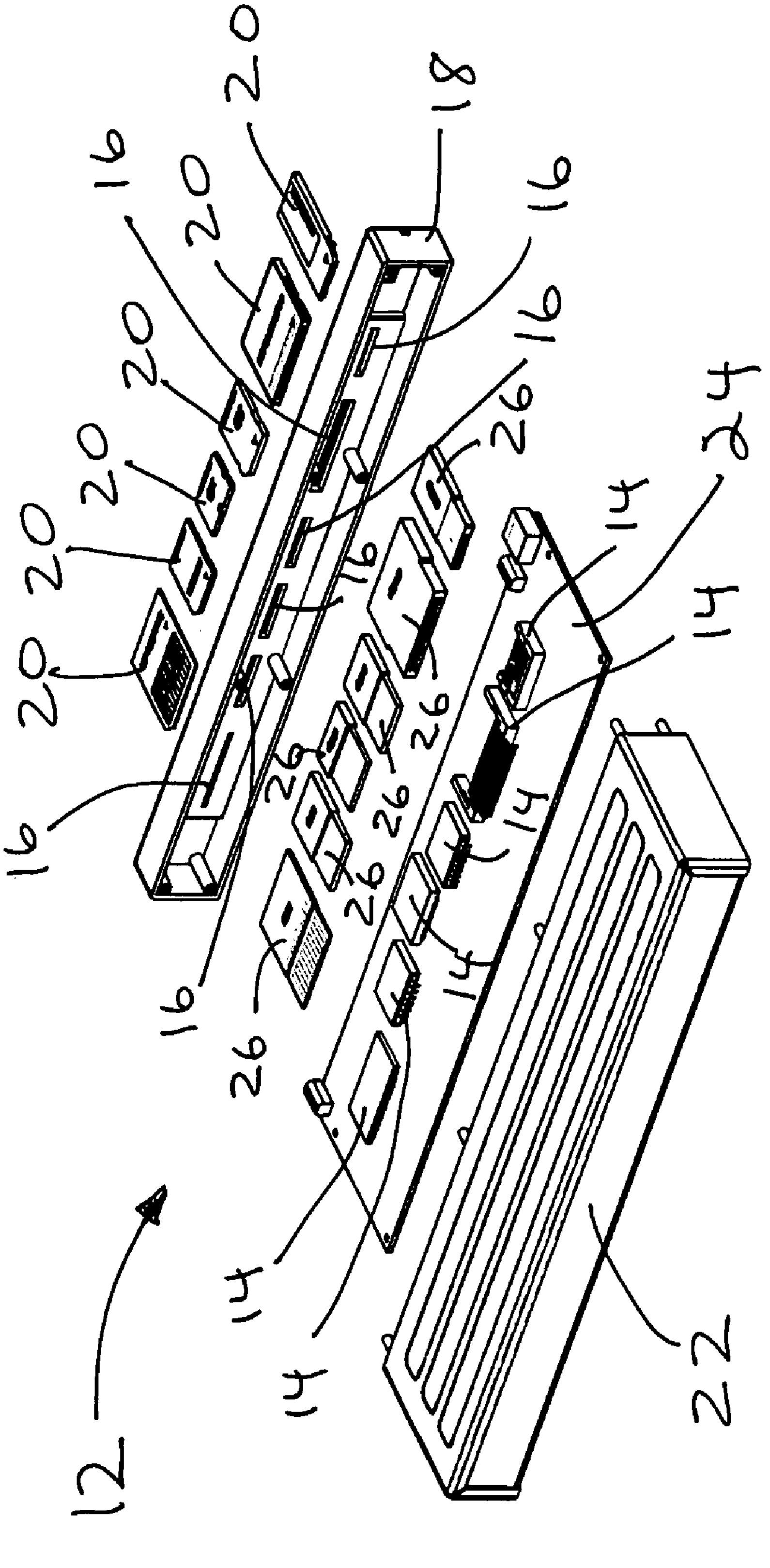
FIG. 4 is an exploded view of a memory card reader having multiple receivers with corresponding multiple memory card bridges oriented behind a plate or member bezel.

FIG. 4 depicts one manner of implementing the bridge system. FIG. 4 is similar to FIG. 2, but shows the bridges 26 of the subject invention interposed between receivers 14 and storage cards 20. A plurality of bridges 26 are positioned between a plurality of receivers 14 and storage cards 20. Receiver insertion section 30 of each bridge 26 slips into a corresponding opening 34 (FIG. 7) (sometimes called a socket) in receiver 14 configured for that type of storage card 20 and is positioned in the card reader housing 22 behind face plate 18 aligned with corresponding slot 16. A space exists between receiver 14 and face plate 18 dimensioned with respect to bridges 26 so that bridges 26 are positioned behind the face plate 18 when reader 12 is assembled. Card receiving sections 28 of bridges 26 include an opening 32 dimensioned to accept a storage card 20 of the same type as the type of receiver 14 into which the particular bridge 26 is inserted. In this embodiment the existence of bridges 26 interposed between receivers 14 and face plate 18 will not be readily apparent to a user, nor would bridges 26 be removable by users without the removal of face plate 18, minimising the opportunity for bridges 26 to be removed in an unauthorised manner thereby defeating their purpose.

However, the invention is not limited to such an internal bridge 26. Bridge 26 could be located wholly or partially on the opposite side of face plate 18 from receiver 14, particularly in applications where unauthorised removal of bridge 26 is not a problem and as well in applications involving the retrofitting of bridges 26 for use in an existing reader 12. In that situation a substantial part of bridge 26 would be exposed outside of the card reader 12 face plate 18 extending from slot 14.

Figure 5:
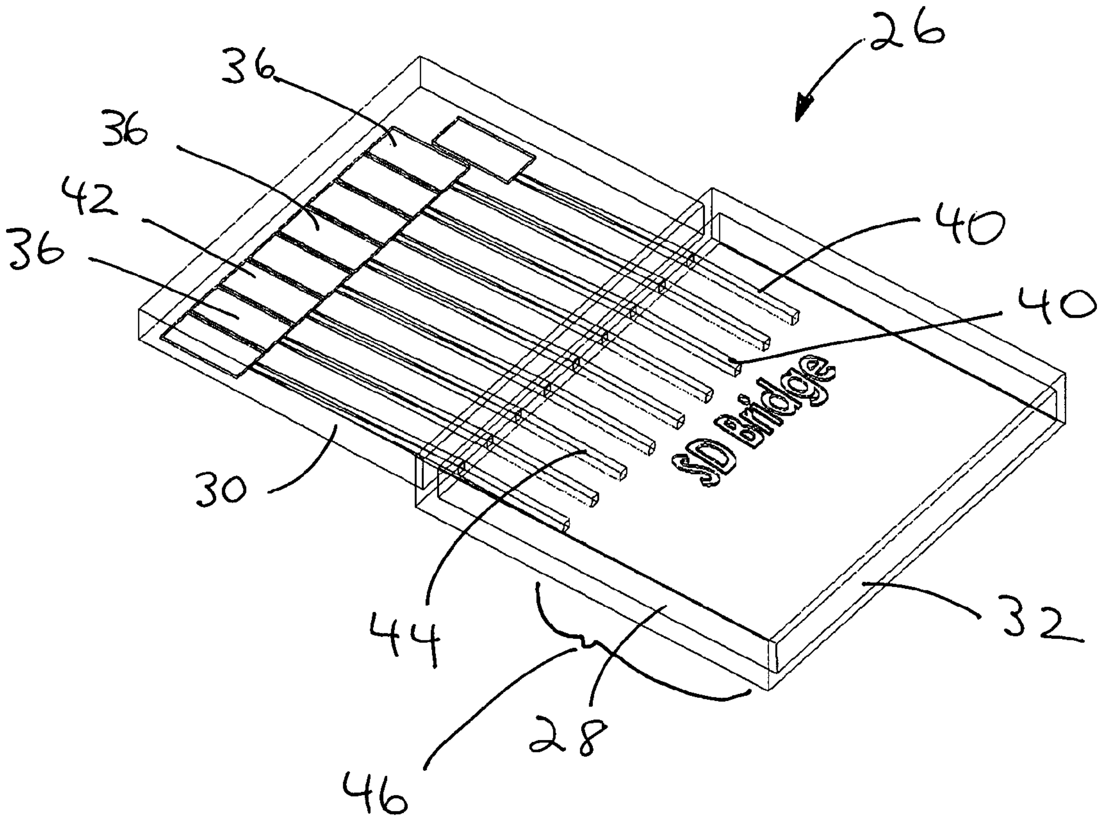
FIG. 5 depicts the internal structure of a type of memory card bridge suitable for use with an SD (Scan Digital) type of memory card and a receiver for operatively receiving a SD type of memory card.

FIG. 5 depicts the internal structure of bridge 26. In this example bridge 26 is configured for use with an SD type memory card and corresponding SD type receiver 14. The receiver insertion section 30 is positioned at one end of bridge 26 and includes the number, position and size of individual internal receiver insertion connectors 36 as is found at the connection end 38 (FIG. 9) of an SD type memory card in order to slip into and connect with the opening 34 (FIG. 7) (sometimes called the socket) of receiver 14 configured for an SD memory card. The card receiving section 28 is positioned at the opposite side of bridge 26 from receiver insertion section 30. Card receiving section 28 includes opening 32 which includes a plurality of card receiving connectors 40. Connectors 40 are the same in number, position and size as the individual connectors in a receiver 14 configured for an SD memory card to enable the SD memory card to slip into opening 32 to connect to card receiving connectors 40. Each electrical contact connection member of connectors 40 is connected to a corresponding respective individual electrical contact connection member of connectors 36 through a central region of bridge 26 to permit data to pass through bridge 26 between the receiver 14 and the SD memory card 20. For example individual electrical contact connection member 42 of connectors 36 is directly connected to individual electrical contact connection members 44 of connectors 40.

Figure 6:
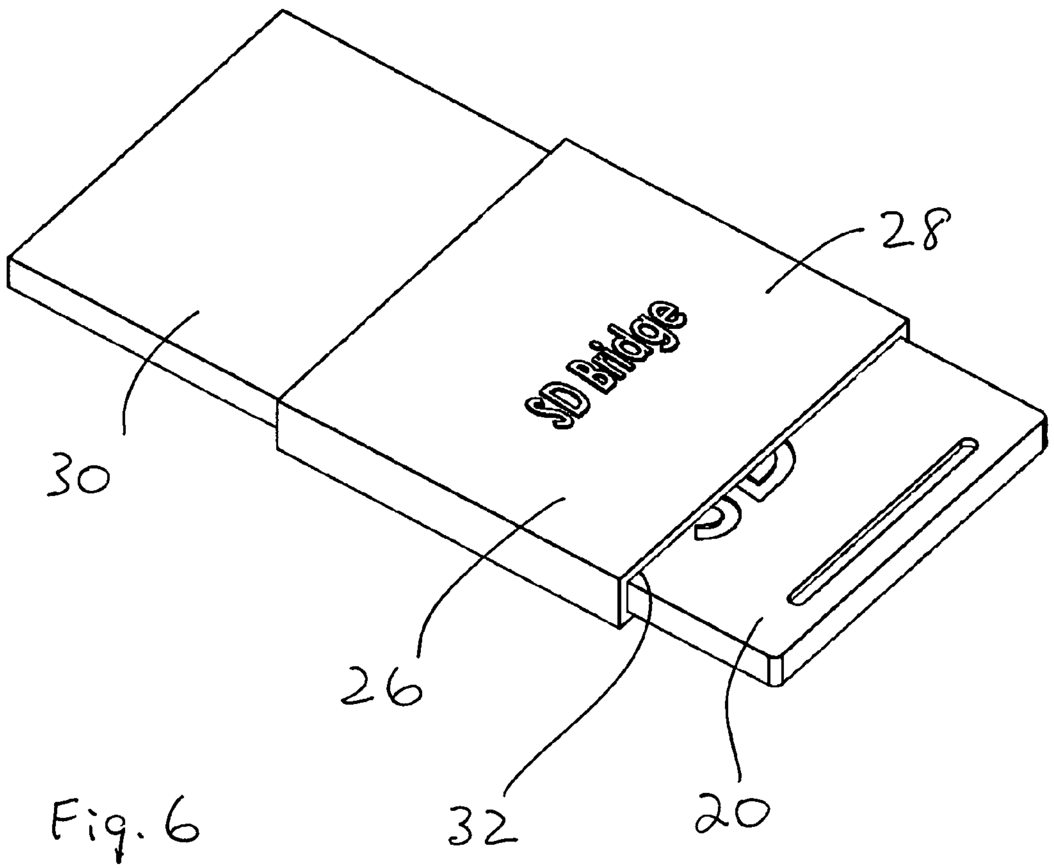
FIG. 6 depicts the SD memory card bridge of FIG. 5 with an SD memory card inserted in the card receiving section of the bridge.

FIG. 6 depicts an SD memory card 20 inserted into opening 32 of bridge 26 configured for an SD memory card. Bridge 26 will hold the SD card 20 in operative electrical connection with connectors 40. Receiver insertion section 30 is connectable to receiver 14 of card reader 12 configured for an SD memory card. Connectors 36 will then be in electrical connection with internal connectors (not shown) inside opening 34 of receiver 14 configured for an SD memory card.

FIGS. 5 and 6 also depict a further advantage of this invention in showing how opening 32 of card receiving section 28 of the bridge 26 includes a rectangular extension 46 as a part of opening 32 that acts as a guide to assist in the proper alignment of the SD memory card 20 into opening 32 for proper connection with the individual electrical contact connection members 44 of connectors 40 the bridge 26. In this embodiment, at least 50% of the length of the SD memory card 20 is within extension 46. This feature reduces the risk of damage to the SD card 20 or the card receiving section 28 and related internal connectors 40 of bridge 26 thereby lengthening the useful life of bridge 26.

Figure 7:
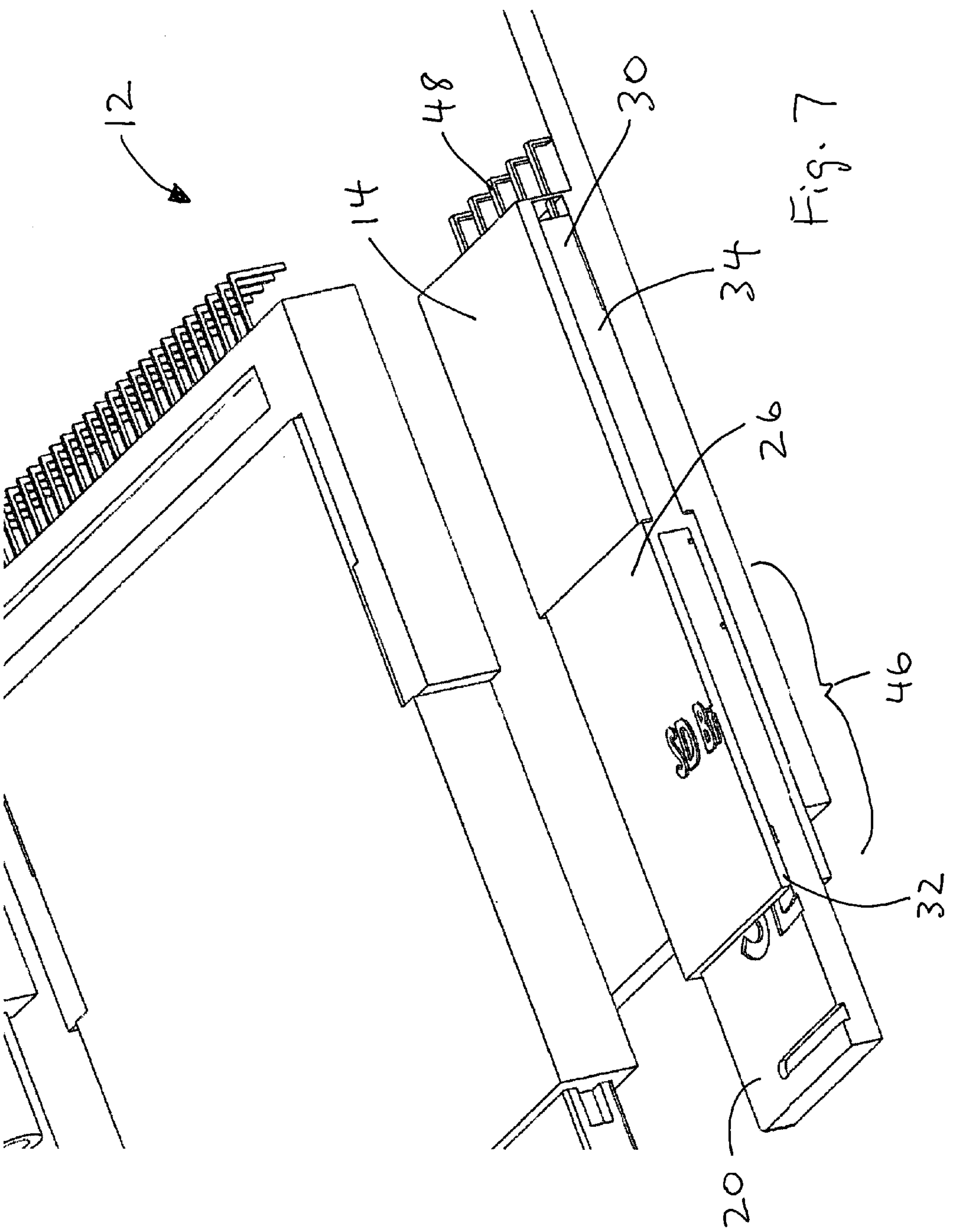
FIG. 7 depicts a side sectional view of an SD memory card, an SD memory card bridge and SD memory card receiver of the card reader all connected together for use.

FIG. 7 is a cross-sectional view depicting bridge 26 interposed between memory card 20 and receiver 14 when in use. Memory card 20 is shown inserted into opening 32 of card receiving section 28. The connectors (not shown) at connection end 38 of memory card 20 are in electrical contact with connectors 40 of card receiving section 28. Connectors 36 of receiver insertion section 30 are in electrical connection with connectors 48 of receiver 14. In this example all three of memory card 20, bridge 26 and receiver 14 are configured for an SD memory card 20.

It can also be seen that memory card 20 is housed within opening 32 with a substantial amount of memory card 20 inside opening 32 as defined by extension 46. In this embodiment, the substantial amount is more than 50% of its length. This ensures that memory card 20 enters opening 32 and connects with connectors 40 in a parallel fashion with the sides of opening 32 to connect with connectors 40 in a manner which reduces the abrasion and damage on connectors 40 as well as the connectors (not shown) of memory card 20.

Figure 8:
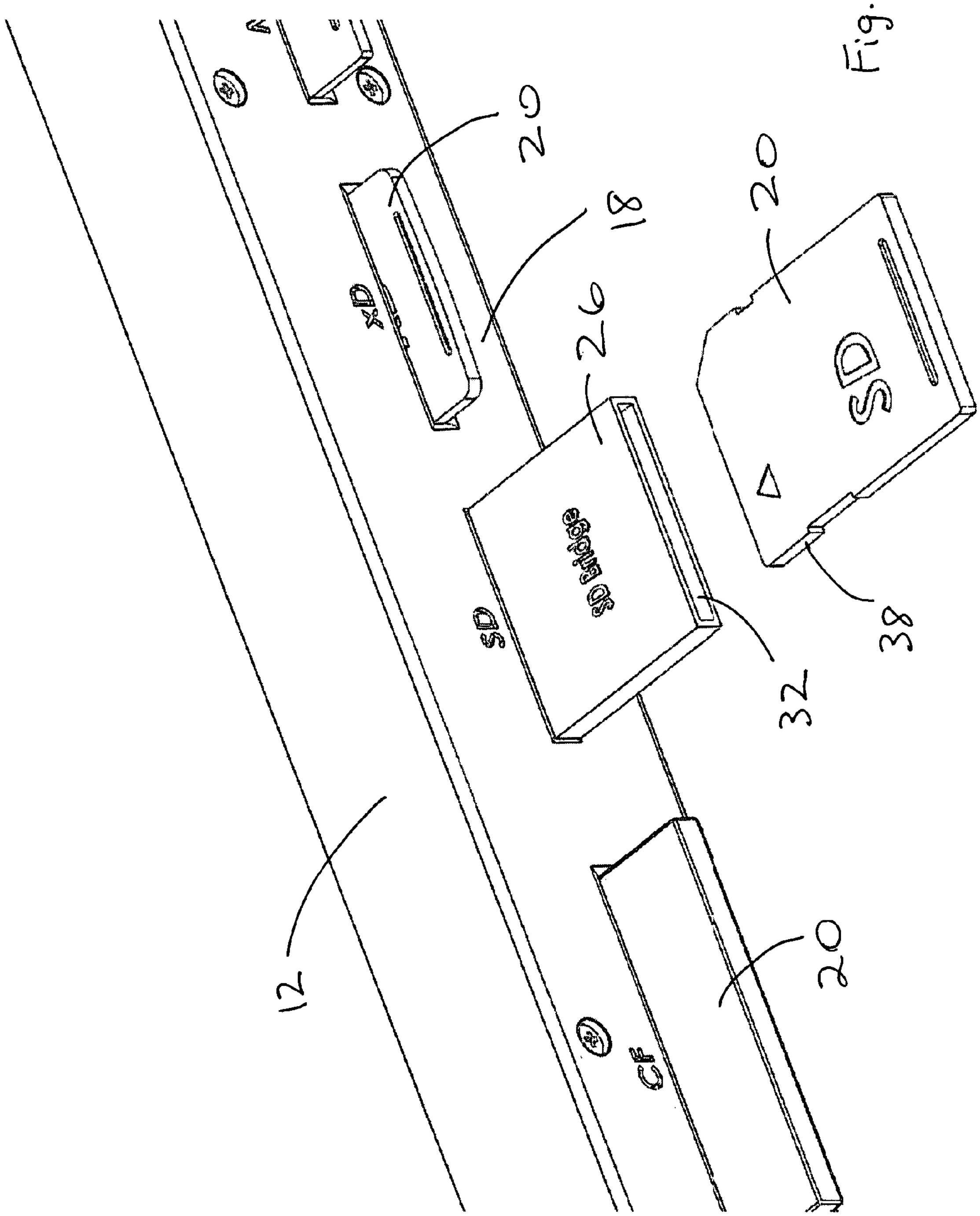
FIG. 8 depicts an exemplary manner of use of the memory card bridge using an SD memory card about to be inserted into the card receiving section of the SD bridge.
Figure 9:
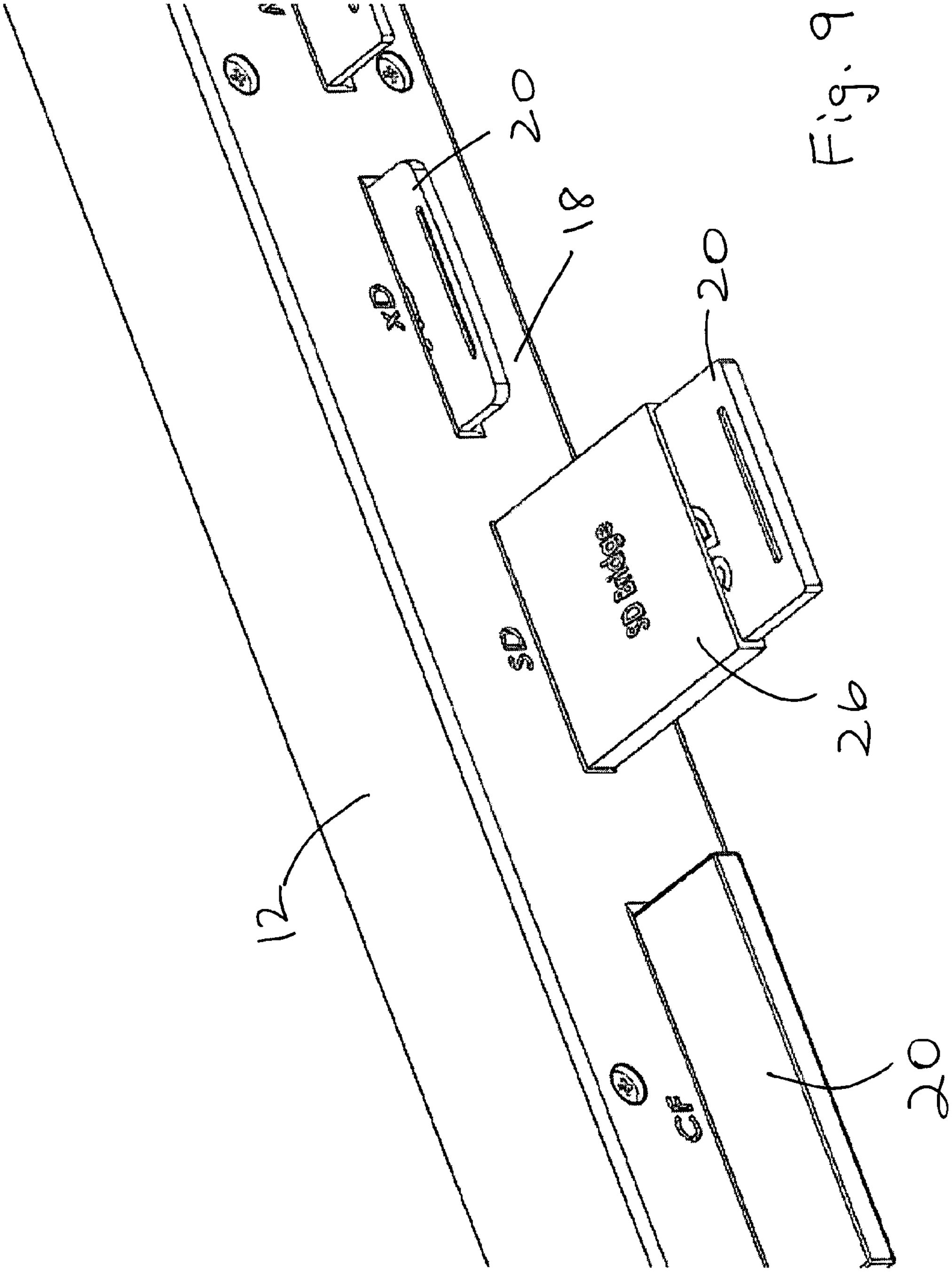
FIG. 9 depicts the exemplary manner of use of FIG. 8 with the SD memory card inserted into the SD memory card bridge which is connected to the receiver of a card reader.

FIGS. 8 and 9 depict bridge 26 configured for an SD memory card 20 which is retrofitted externally to a type of card reader 12 which as not been pre-configured for use with bridge 26. In this embodiment at least a portion of bridge 26 extends outside of face plate 18 and housing 22. Bridge 26 slips into housing slot 16 configured in this example for an SD memory card 20 to connect internally into opening 34 of receiver 16 also configured for an SD memory card 20. A substantial part of bridge 26, including opening 32 of bridge 26 extends outwardly from face plate 18. SD memory card 20 can be inserted into the opening 32 to be connected to connectors 40 of bridge 26. Bridge 26 is, in turn, inserted into opening 34 of receiver 14 to provide electrical contact between connectors 36 of Bridge 26 and connectors 48 of receiver 14.

FIG. 9 depicts SD memory card 20, bridge 26 and card reader 12 oriented in this manner, with bridge 26 retrofitted externally to card reader 12. Card reader 12 may then read from and write to SD memory card 20 through bridge 26.

As regards the internal bridge 26 of an embodiment of this invention, when in use if there is malfunction of bridge 26 for whatever reason, including to abrasion of contacts 40 of bridge 26 or mishandling of memory card 20, the face plate 18 or the housing 22 of the card reader 12 can be easily removed.

The inoperative bridge 26 can then be easily removed by pulling it from opening 34 of receiver 14 and a new bridge 26 can be inserted into opening 34 to take its place. This can all be undertaken by untrained personnel simply, quickly and cheaply. If bridge 26 is in a card reader of a digital camera or other electronic device, and there is a problem with that bridge 26 through use or misuse, only bridge 26 need be replaced and the digital camera or other device is ready for continued use.

As regards the external bridge 26 of an embodiment of this invention preferred for retrofitting to an existing card reader 12, when in use bridge 26 remains in receiver insertion section 30 of receiver 14 and memory card or cards 20 are inserted and removed from card receiving section 28, as desired by a user. If there is malfunction of bridge 26 for whatever reason, including to abrasion of contacts 40 of bridge 26 or mishandling of storage card 20, the inoperative bridge 26 can be easily removed by pulling it from opening 34 of receiver 14 through slot 16 and a new bridge 26 can be inserted through slot 16 into opening 34 to take its place. Face plate 18 is not removed. This can all be undertaken by untrained personnel simply, quickly and cheaply.

An alternate embodiment of the invention will now be described with reference to FIGS. 10A, 10B and 11 through 19.

In this embodiment, a plurality of bridges are provided with each configured to accept a particular type of memory card at an end. The bridges have a uniform other end for insertion into the integrated circuit board connectors of a reader to facilitate easy substitution of bridges compatible with any particular type of memory cards in the card reader.

Figure 10A:
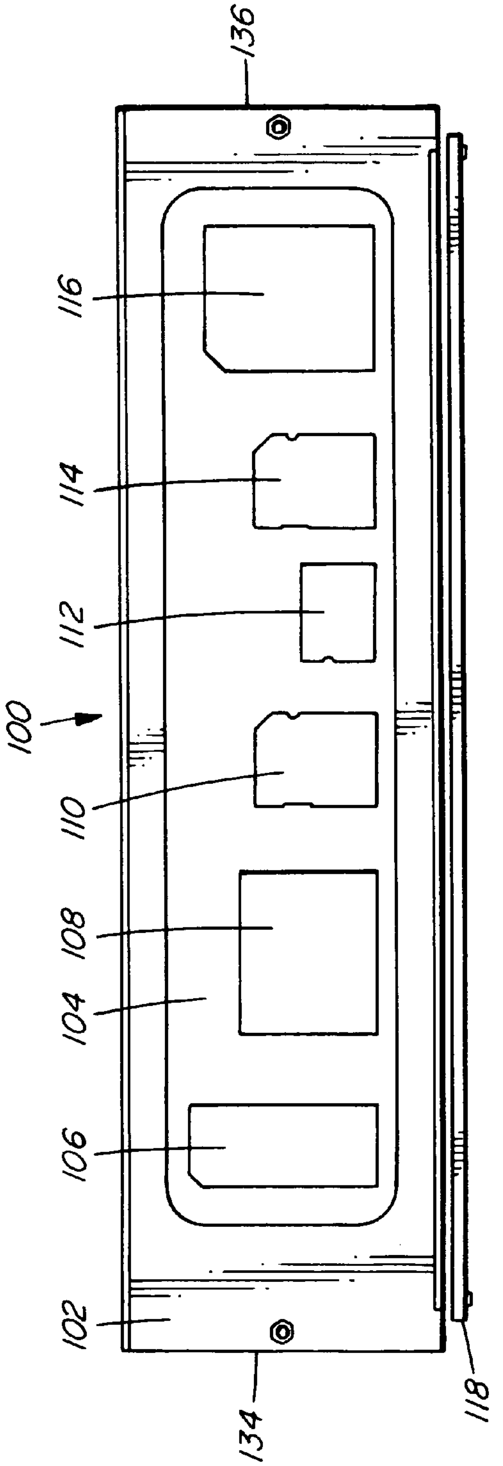
FIG. 10A is a schematic top view of the memory card reader of another embodiment of the subject invention.

Referring to FIG. 10A, reader 100 is shown schematically in a top view. Reader 100 consists of a boxed housing with upper surface 102 shown. A series of schematic representations 104 of various types of memory cards is printed on surface 102. In this embodiment this includes representations of MS (memory stick) card 106, CF (compact flash), 108, SD (secure digital) card 110, xD card 112, MMC (multi-media) card 114, and SM (smart media) card 116.

Each of these types of memory cards have predetermined sizes, that is length, width and thickness as well as electrical contacts in predetermined standard electrical contact pattern. These standard sizes and electrical contact patterns are unique for each type of memory card and a card reader configured to accept and communicate with one type of memory card is generally unsuitable for communication with another type of memory card in a prior art system. Many of the different types of memory cards and their different sizes and electrical contact patterns are described in U.S. Pat. No. 7,152,801, the contents of which are herein incorporated by reference.

Reader 100 includes face plate 118 which is connected to the front of reader 100 to enclose reader 100 from the front. It should be noted that while face plate 118 is shown separated from upper surface 102 in FIG. 10A. However, face plate 118 is connected to upper surface 102, as well as end faces 134 and 136 and bottom surface (not shown) to form an enclosed front face of reader 100. Four screw members 138 removably attach face plate 118 to reader 100.

Figure 10B:
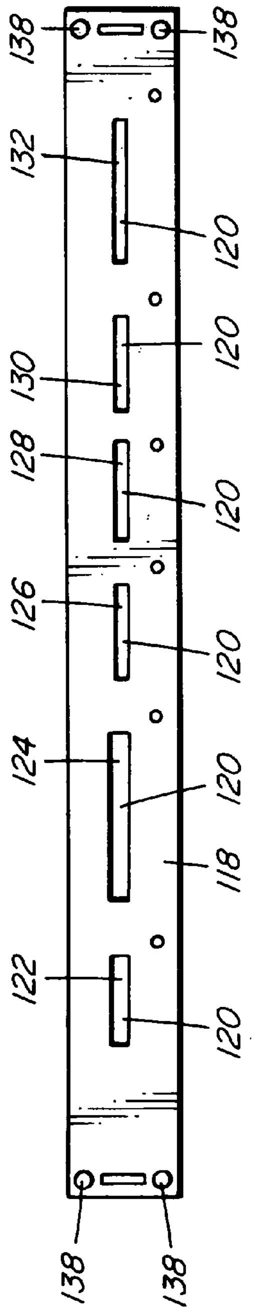
FIG. 10B is a front plan view of a face plate of the embodiment of FIG. 10A.

Referring to FIG. 10B, face plate 118 is depicted with a plurality of openings 120. Openings 120 are of varying width and height to accommodate particular memory cards therein. In the example depicted in FIG. 10B, opening 122 is configured to accept a memory stick into opening 122. Opening 124 is configured to accept a compact flash memory card into opening 124. Opening 126 is configured to accept a secure digital memory card into opening 126. Opening 128 is configured to accept an xD memory card. Opening 130 is configured to accept a multi-media memory card. Finally, opening 132 is configured to accept a smart media card through opening 132. It can be seen that schematic representations 104 depict memory cards which correspond to the memory cards which are accepted through corresponding openings 120 of face plate 118.

Figure 11:
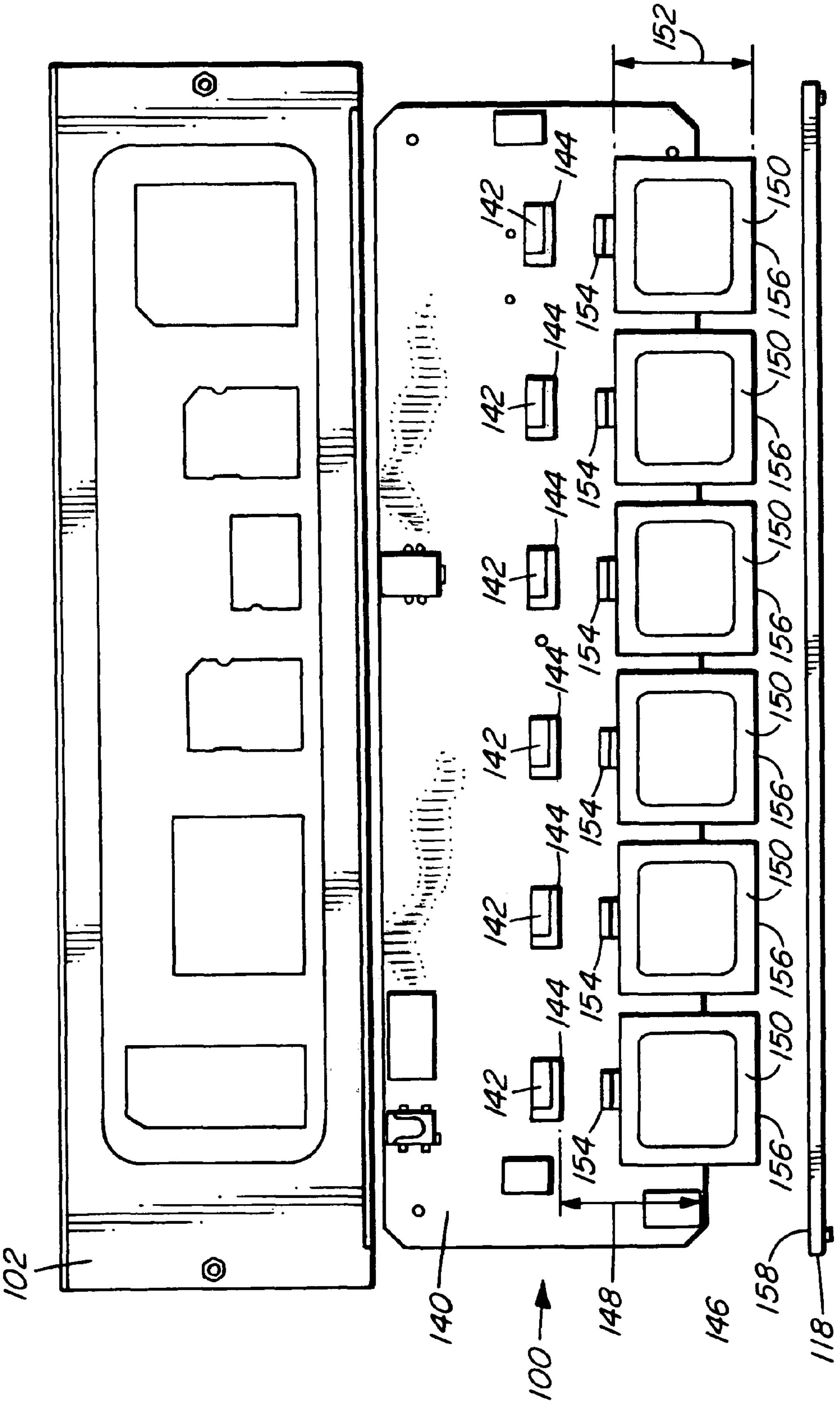
FIG. 11 is a schematic top view of the embodiment of FIG. 10A with components separated and depicting a plurality of bridges of an embodiment of the subject invention.

Referring to FIG. 11, when upper surface 102 is separated from reader 100, integrated circuit board 140 is revealed. Integrated circuit board 140 controls the signals received from the various memory cards for communication with the particular device connected to reader 100, such as a computer or other device which is used to read data from the memory cards or transfer data to the memory cards for storage. Integrated circuit board 140 includes a series of connectors 142 which in this embodiment are identical to one another. Connectors 142 are connected to integrated circuit board by appropriate electrical connections for operative connection of reader 100 to corresponding type of memory cards in order to communicate with the memory card. In the preferred embodiment, connector 142 can be a J14 pin 20×2 with one end connected to the integrated circuit board and the other end comprising receivers 144. Receivers 144 are identical for each of the plurality of connectors 142. Connectors of the type J14 pin 20×2 have the advantage of being inexpensive and contain sufficient electrical connections to accommodate most types of memory card contact requirements.

Each connector 142 is spaced from front edge 146 of integrated circuit board 140 the same distance 148. When in use, face plate 118 is positioned adjacent edge 146.

FIG. 11 also depicts a plurality of bridges 150 with each bridge 150 corresponding to an adjacent connector 142. Bridges 150 are identical in external dimensions. In addition, bridges 150 are large enough in cross-sectional area to be greater than the area of the largest of the openings 120 of face plate 118. This prevents the removal of bridge 150 from reader 100 unless face plate 118 is removed, or moved to a position that permits that removal.

The length of 152 of bridges 150 is identical to distance 148. Bridges 150 include connector insertion section 154 configured physically and electrically to operatively connect to receiver 144 of connectors 142. Each connector insertion section 154 is identical to the other connector insertion sections 154 of bridges 150. This enables any bridge 150 to be connected to any connector 142 of reader 100. Because distance 148 is identical to length 152, when section 154 is inserted into receiver 144 of a connector 142, front face 156 of each bridge 150 is in co-planar alignment in a vertical plane with front edge 146. When face plate 118 is attached to reader 100, inner edge 158 of face plate 118 is generally in co-planar alignment with front edge 146 and front face 156. Inner edge 158 is positioned adjacent front face 156 of each bridge 150 inserted into a corresponding connector 142 of reader 100.

Figure 12:
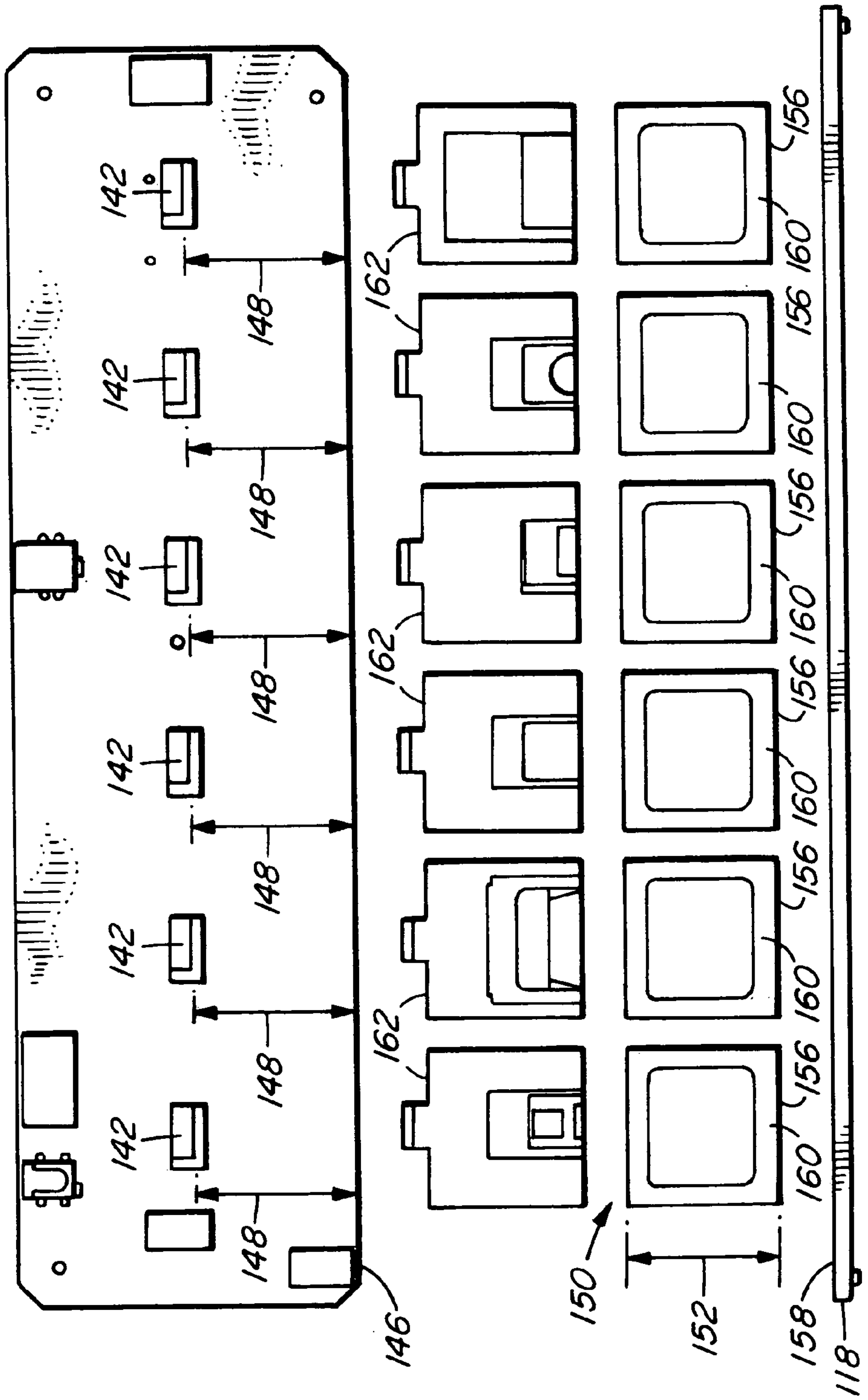
FIG. 12 is a schematic top view of the embodiment of FIG. 11 showing schematically the internal components of the plurality of bridges.
Figure 13:
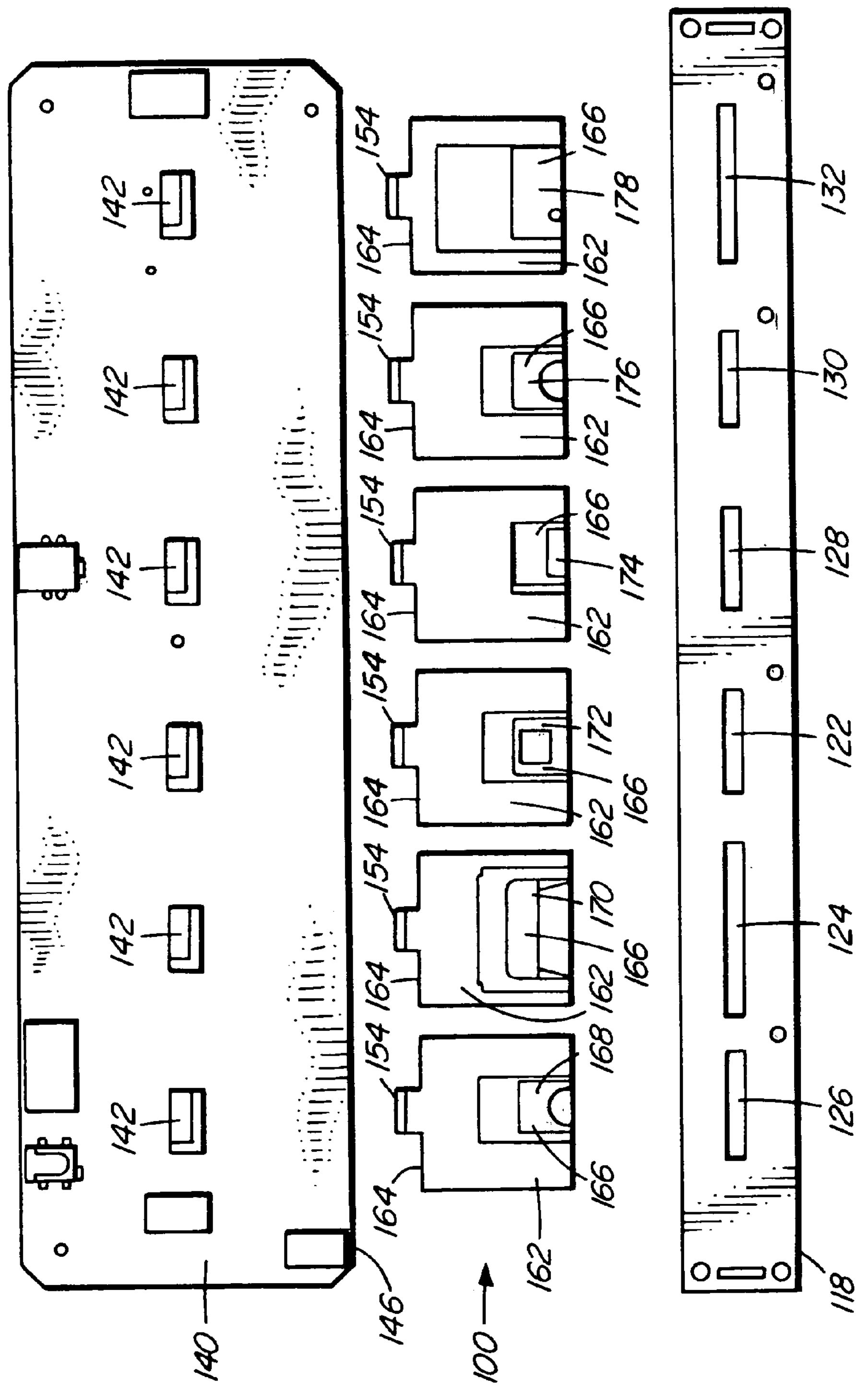
FIG. 13 is a top view of the embodiment of FIG. 11 with a plate with openings corresponding to adjacent bridges.

Referring to FIGS. 12 and 13, it can be seen that all connectors 142 are positioned the same distance 148 from edge 146. As seen in FIG. 12, bridges 150 include housing 160 as well as base member 162.

FIG. 13 depicts reader 100 without housing 160 for ease of reference. Each base member 162 is identical in size with an identical connector insertion section 154 for insertion into connectors 142. Each base member 162 includes electrical connections (see FIGS. 16-19) to connect a memory card to section 154 for electrical connection to connector 142.

Each connector insertion section is adjacent a second end 164 of base member 162 and thereby of bridge 150. Second end 164 is opposite front face 156 (sometimes identified as a first end) of bridge 150. Connector insertion section 154 is configured to operatively connect to any one of the plurality of connectors 142 with electrical contacts in an electrical contact pattern which is compatible with the electrical contact pattern of the plurality of connectors 142. This permits the exchange of data between bridge 150 and integrated circuit board 140.

Each base member 162 of bridge 150 includes a data storage device receiving section 166 adjacent front face 156 of bridge 150. Receiving section 166 is configured to receive and operatively connect to a predetermined type of data storage device (memory card) having data storage device electrical contacts in a pattern of a contact standard of that type of data storage device. This permits the exchange of data between that type of data storage device and receiving section 166.

In the example depicted in FIG. 13, receiving section 168 is particularly configured to operatively connect to a secure data type of data storage device. When in use, receiving section 168 is aligned with opening 122 so that a secure digital type of data storage device may be inserted through opening 126 into receiving section 168 to operatively connect the secure digital type of data storage device with receiving section 168. When bridge member 150 containing receiving section 168 is inserted into any one of connectors 142, a secure digital type of data storage device inserted into receiving section 168 may communicate with integrated circuit board 140 to send and receive data between that secure digital type of data storage device and integrated circuit board 140.

In a similar manner, receiving section 170 is configured to operatively accept a compact flash type of data storage device through opening 124. Receiving section 172 is configured to operatively accept a memory stick type of data storage device through opening 122.

It can be seen that each type of bridge 150 can be positioned anywhere along the length of reader 100 provided that face plate 118 contains openings 120 which correspond to a particular type of memory card compatible with the particular receiving section 166 of bridge 150. Comparing FIG. 10B to FIG. 13, it can be seen that the left most opening is opening 122 in FIG. 10B and is opening 126 in FIG. 13. Bridge 150 behind face plate 118 would have receiving section 172 (compatible with a memory stick type of data storage device) behind face plate 118 of FIG. 10B whereas it would have receiving section 168 (compatible with a secure digital type of data storage device) behind face plate 118 in FIG. 13.

Figure 14:
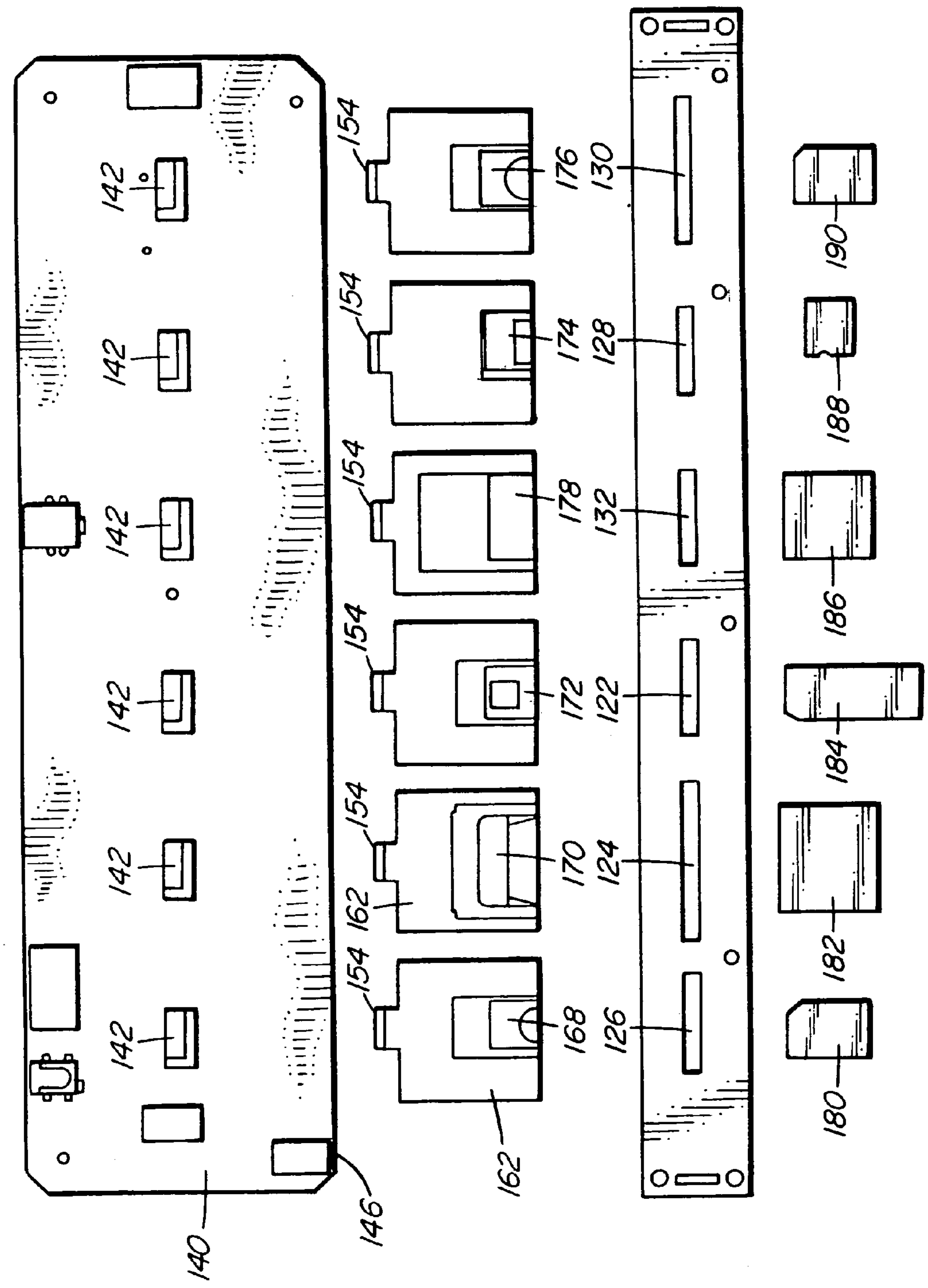
FIG. 14 is a top view of the embodiment of FIG. 11 showing various memory cards associated with corresponding bridges of the embodiment of FIG. 11.

Referring to FIG. 14, face plate 118 is shown with opening 126 adjacent base member 162 having a secure digital receiving section 168. A secure digital type of data storage device 180 is depicted adjacent opening 126 for insertion through opening 126 into receiving section 168 to operatively connect to integrated circuit board 140 when the corresponding bridge 150 with receiving section 16, is connected to connector 142.

Opening 124 is to the right of opening 126 configured for a compact flash type of storage device 182. Base member 162 having receiving section 170 configured to accept compact flash storage device 182 is positioned adjacent opening 124.

To the right of opening 124, opening 122 is configured to accept a memory stick type of storage device 184 for insertion into memory stick receiving section 172. To the right of opening 122, opening 132 is configured to accept smart media type of storage device 186 through opening 132 for operative connection to smart media receiving section 178.

To the right of opening 132 is opening 128 to accept xD type of storage device 188 through opening 128 for operative connection to xD receiving section 174.

To the right of opening 128 is opening 130 for receiving multi-media type of storage device 190 through opening 130 for operative connection to multi-media receiving section 176.

It can be seen in comparing FIGS. 10B, 13 and 14 that openings and corresponding receiving sections can be oriented in any position along integrated circuit board 140 provided that face plate 118 is configured with appropriately-sized openings 120 to match corresponding receiving sections of bridges 150 to enable operative connection of each type of storage device with a corresponding receiving section. Connector insertion sections 154 which is the same for each bridge 150 may then be connected to a connector 142 for operative connection of a connected data storage device to integrated circuit board 140.

Figure 15:
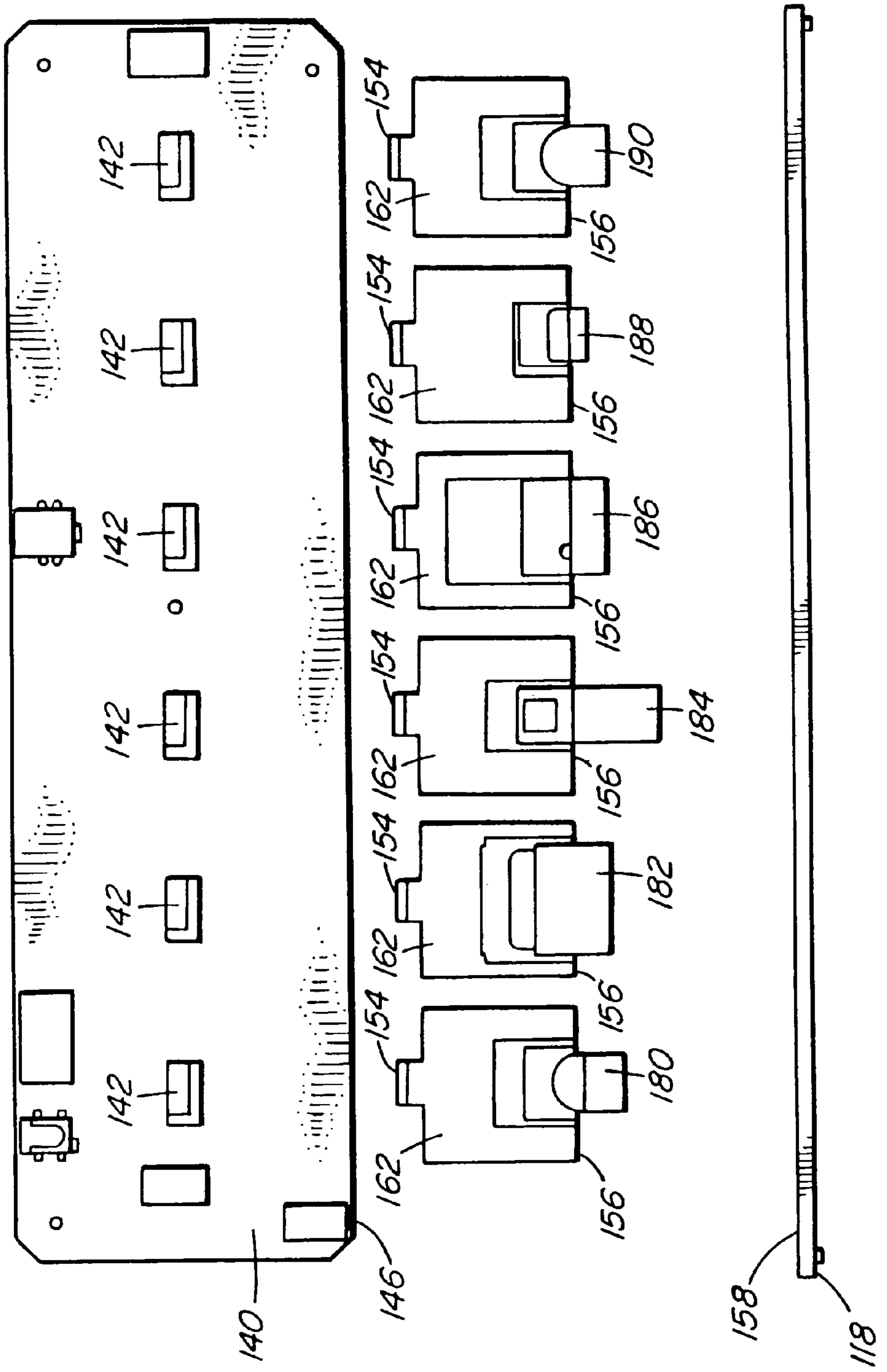
FIG. 15 depicts schematically the embodiment of FIG. 11 with memory cards inserted into corresponding bridges.

FIG. 15 depicts base members 162 with corresponding data storage devices inserted for operative connection to each bridge 150. The position of each type of storage device and its corresponding base member 162 is the same to that of FIG. 14. When each bridge 150 is inserted into a connector 142 though connector insertion sections 154, front face 156 of each bridge 150 is in co-planar alignment with front edge 146 of integrated circuit board 140. As well, when face plate 118 is connected to the other components of the housing of reader 100, including upper surface 102, inner edge 158 is also co-planar with front face 156 and front edge 146. With face plate 118 attached in this manner, it is not possible to remove bridges 150 from reader 100. They remain securely connected to each one of connectors 142. Only when face plate 118 is removed or moved to an appropriate position may bridges 150 be removed from reader 100. At the same time with the removal of face plate 118, any bridge 150 may be easily removed and replaced by a bridge compatible with a different type of memory card, or with the same type of bridge, or may be moved to a different position along reader 100.

It should also be noted that while the various storage devices 180 through 190 extend beyond front face 156, they will extend through corresponding openings 120 in the face plate 118 in order to be readily inserted and removed by users through those openings.

It can also be readily seen that the position of the bridges along the length of reader 100 can be changed in accordance with the desires of users or manufacturers in order to accommodate particular types of storage devices along that length. Bridges 150 are readily removed and replaced when face plate 118 is removed. This permits manufacturers or users to change the type of memory card or cards which can be accommodated in reader 100 as desired. Reader 100 can be configured for multiple types of storage devices or the same type of storage device can be accommodated in more than one position along the length of reader 100.

As well, as new types of storage devices are developed, it is a relatively simple matter to configure bridge 150 with a data storage device receiving section 166 which is configured to accommodate that new type of storage device. Connector storage section 154 remains the same and that bridge will readily fit within connector 142 to operatively connect that new type of storage device with integrated circuit board 140.

This system provides an easy and inexpensive means for configuring storage device reader 100 to accommodate many different types of storage devices, reposition storage devices along the length of reader 100, update reader 100 to accommodate new types of storage devices and replace worn out bridges with the same type of bridge to reduce "wear and tear" on connector 142 attached to integrated circuit board 140.

Figure 16:
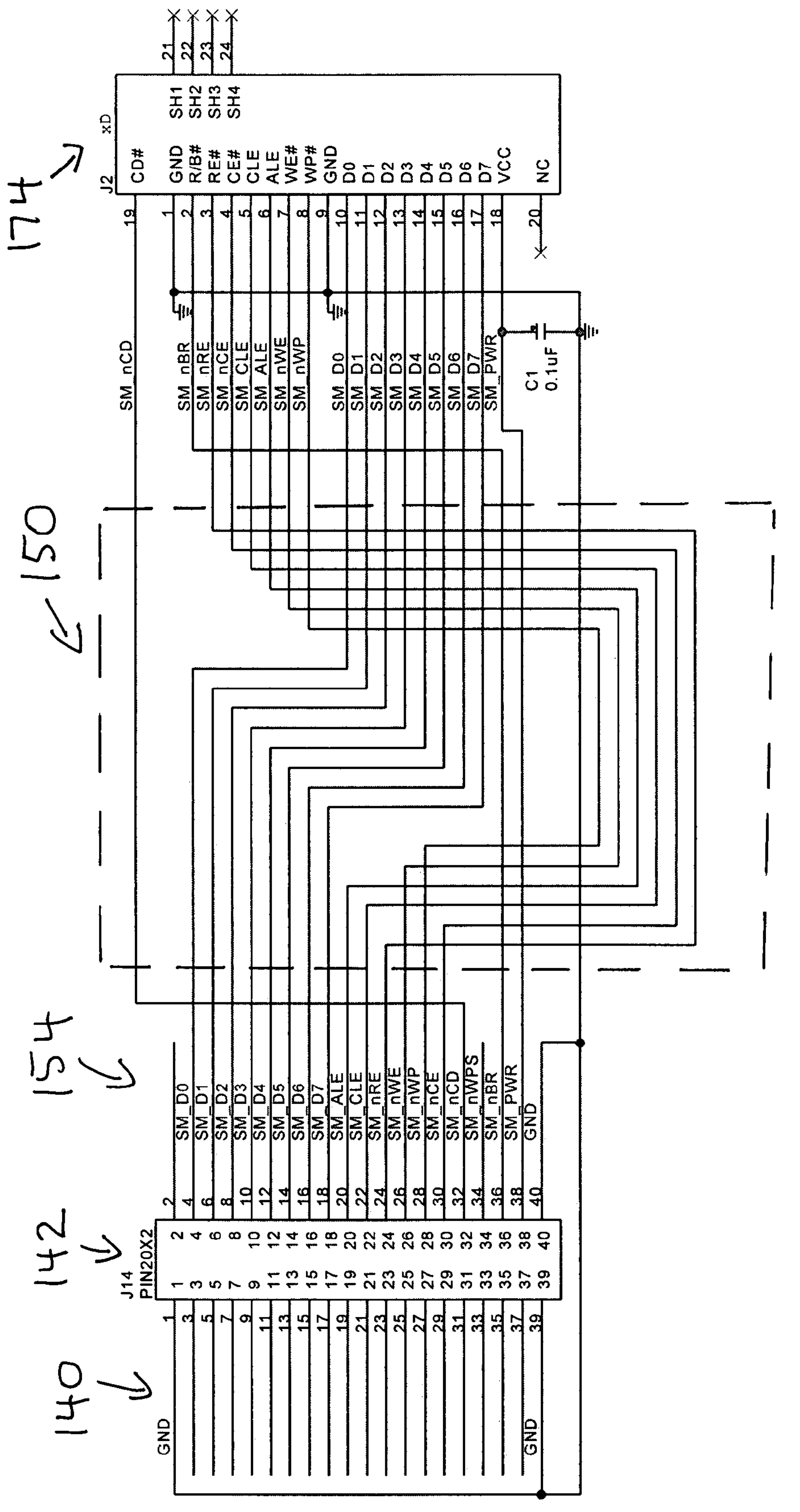
FIG. 16 is a schematic diagram showing the connections between an xD type of memory card receiving section, corresponding bridge and a J14 pin 20×2 for connection with the integrated circuit board of the card reader of FIG. 10A.

Referring to FIG. 16, the electrical connection of xD card 188 to circuit board 140 is depicted schematically. When xD card 188 is inserted into xD receiving section 174 of bridge 150, connections are made in the manner depicted between xD storage device 188 and xD receiving section 174. xD receiving section 174 is connected through bridge 150 to connector insertion section 154 of bridge 150. When bridge 150 is connected to connector 142 through connector insertion section 154, electrical connection is made in the manner depicted between those two sections in FIG. 16. Connector 142, in this example, is a J14 pin 20×2 which is, in turn, connected to integrated circuit board 140 for exchange of data between xD type storage device 188 and integrated circuit board 140.

Figure 17:
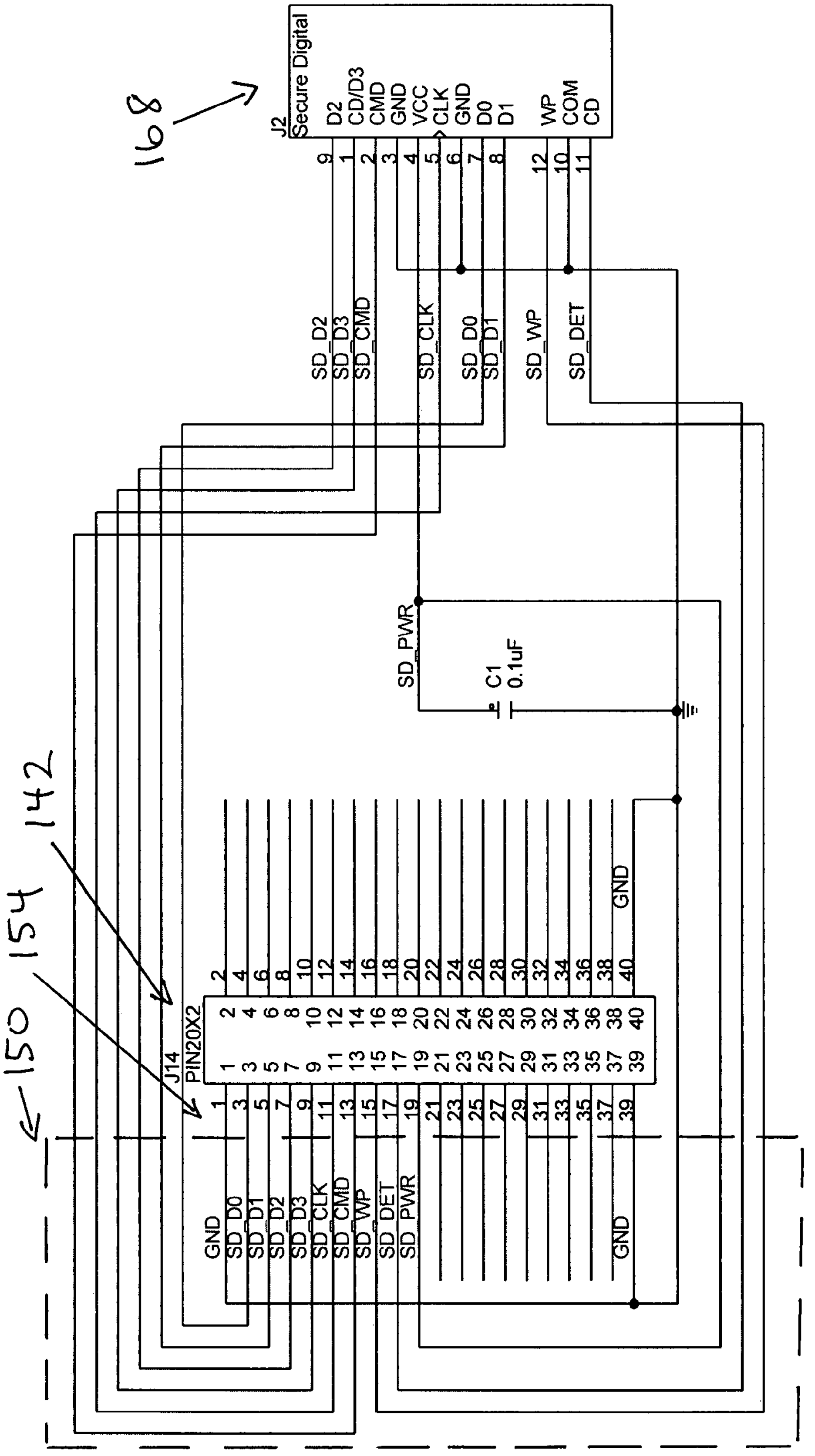
FIG. 17 is a schematic diagram showing the connections between a Secure Digital type of memory card receiving section, corresponding bridge and a J14 pin 20×2 for connection with the integrated circuit board of the card reader of FIG. 10A.

FIG. 17 depicts the connection between a secure digital type storage device 180 and integrated circuit board 140 through bridge 150. Secure digital type storage device 180 is connected to secure digital receiving section 168 through connections 192. The connection extends through bridge 150 to connector insertion section 154 when connector insertion section 154 is inserted into connector 142, shown as a J14 pin 20×2. Connector 142 is, in turn, connected to integrated circuit board 140 in order that data may be exchanged between integrated circuit board 140 and secure digital type storage device 180.

Figure 18:
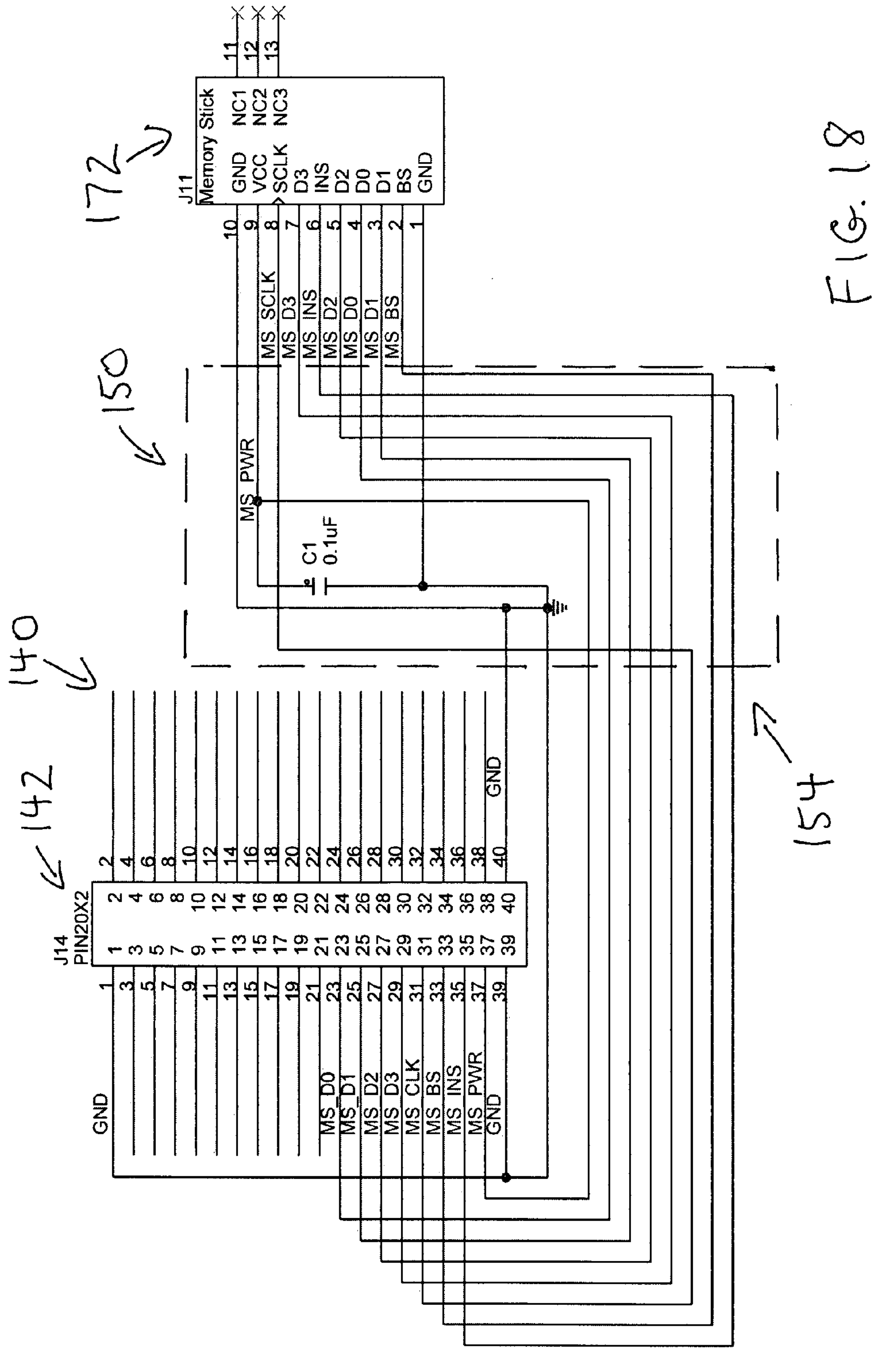
FIG. 18 is a is a schematic diagram showing the connections between an memory stick type of memory card receiving section, corresponding bridge and a J14 pin 20×2 for connection with the integrated circuit board of the card reader of FIG. 10A.

Referring to FIG. 18, memory stick type storage device 184 is connected to memory stick receiving section 172 of bridge 150. Electrical connection extends through bridge 150 to connector insertion section 154 which is connected to connector 142 which is also a J14 pin 20×2. Connector 142 is then connected to integrated circuit board 140 in order to provide electrical connection between integrated circuit board 140 and memory stick type storage device 184.

Figure 19:
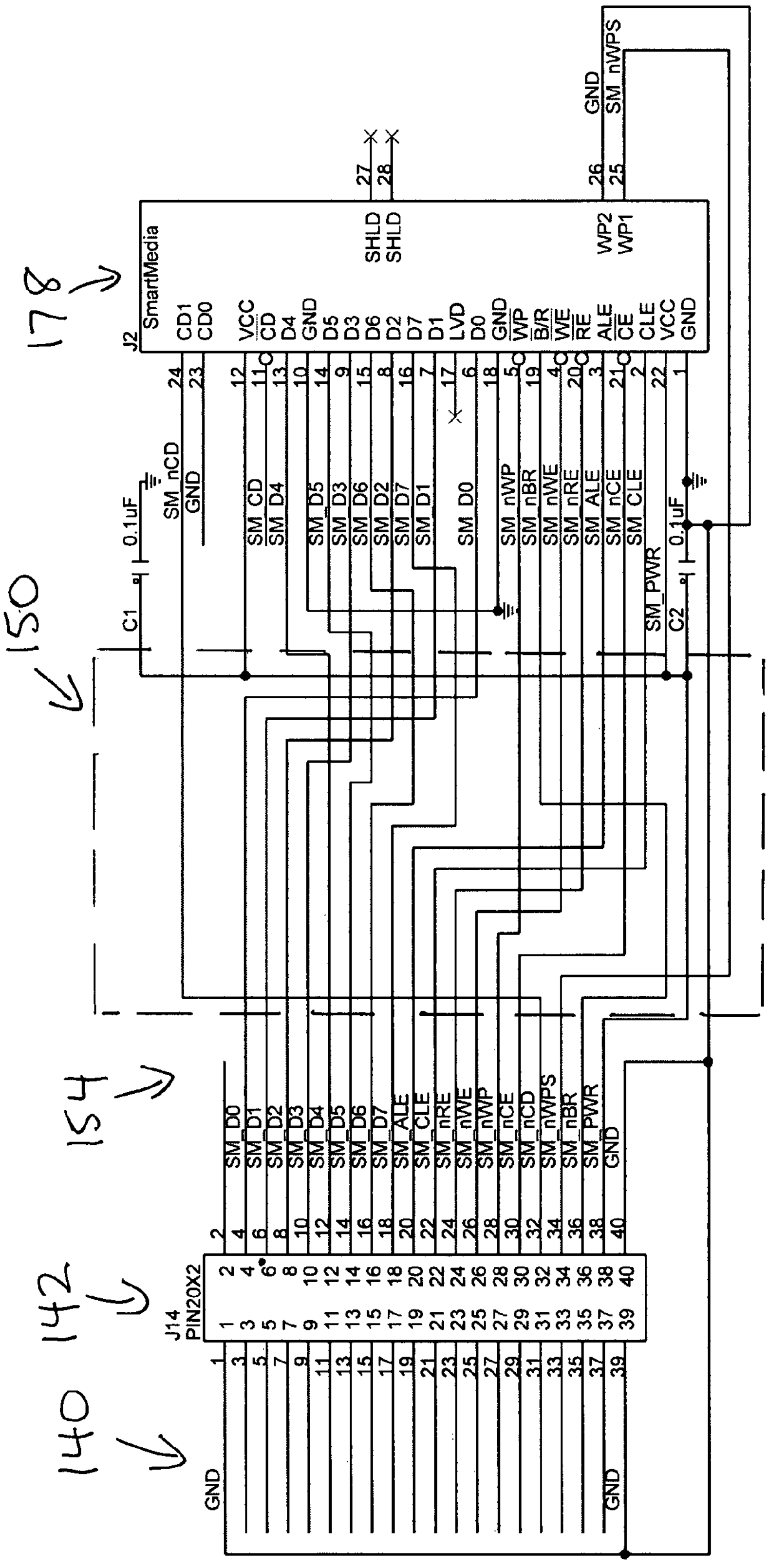
FIG. 19 is a is a is a schematic diagram showing the connections between an smart media type of memory card receiving section, corresponding bridge and a J14 pin 20×2 for connection with the integrated circuit board of the card reader of FIG. 10A.

FIG. 19 depicts a connection of a smart media type storage device 186 to integrated circuit board 140. Smart media type storage device 186 is electrically connected to smart media receiving section 178 of bridge 150. Electrical connection continues through bridge 150 to connector insertion section 154 which is connected to connector 142 on circuit board 140. Connector 142 is also a J14 pin 20×2 connector which is connected to integrated circuit board 140 by way of electrical connections.

As will be apparent to those skilled in the art to which the invention is addressed, the present invention may be embodied in forms other than those specifically disclosed above, without departing from the spirit or essential characteristics of the invention. The particular embodiments of the invention described above and the particular details of the processes described are therefore to be considered in all respects as illustrative or exemplary only and not restrictive. Other configurations could be developed based on known systems with card readers, or as may in the future be developed. The scope of the present invention is as set forth in the complete disclosure rather than being limited to the examples set forth in the foregoing description.

The invention claimed is:

1. A reader for a plurality of data storage devices, comprising:

(a) An integrated circuit board controlling the exchange of data from and to the data storage devices, the integrated circuit board having a front edge;

(b) a face plate communicating with the front edge of the circuit board having a plurality of openings to accept the data storage devices;

(c) a plurality of connectors connected to the circuit board each one spaced the same predetermined distance from the front edge, the connectors configured to operatively exchange data between any type of conventional memory card and the circuit board and having electrical contacts in a connector electrical contact pattern which is the same for each connector;

(d) a plurality of removable bridges, each comprising:

(i) a data storage device receiving section adjacent a first end of each bridge configured to receive and operatively connect to a pre-determined type of data storage device having data storage device electrical contacts in a pattern of a contact standard of a type of data storage device so as to permit the exchange of data with the data storage device;

(ii) a connector insertion section adjacent a second end of each bridge, opposite the first end, configured to operatively connect to any one of the plurality of connectors and having electrical contacts in an electrical contact pattern compatible with the connector electrical contact pattern so as to permit the exchange of data with the circuit board;

(iii) a series of electrical contacts connecting the electrical contacts of the data storage device receiving section and the electrical contacts of the connector insertion section;

(e) the distance between the first end and the second end of each bridge is substantially equal to the pre-determined distance so that when the connector insertion section of a bridge is operatively connected to a connector the data storage device receiving section of the bridge is positioned adjacent the face plate.

2. The memory card reader of claim 1 wherein when in normal operation the face plate is oriented with respect to the circuit board in a normal position which prevents the removal of the bridge from the connector and replacement with another bridge, and wherein such removal and replacement is permitted when the face plate is moved from its normal position to an open position.

3. The memory card reader of claim 1 wherein the bridge further comprises an integrated circuit for converting data transmitted between the data storage device receiving section and the connector insertion section to a form which permits exchange of data between the data storage device and the integrated circuit board of the reader.

4. The memory card reader of claim 1 wherein the connector electrical contact pattern is not compatible with a pattern of a contact standard of a type of data storage device.

5. The memory card reader of claim 1 wherein the data storage device receiving sections of more than one of the bridges have an identical data storage device electrical contact patterns.

6. The memory card reader of claim 1 wherein the data storage device receiving sections of more than one of the bridges have different data storage device electrical contact patterns.

7. The memory card reader of claim 1 wherein the data storage device receiving section comprises a housing with an opening dimensioned to receive the type of memory card for operative connection to the data storage device receiving section for transmission of data between the data storage device and the receiver wherein the housing comprises upper and lower planar members connected by opposed sides all dimensioned to provide a guide to ensure proper insertion of the data storage device into the data storage device receiving section and operative connection between the data storage device and the data storage device receiving section.

8. The memory card reader of claim 1 wherein the plurality of openings are uniform in size and dimensioned to accept any type of data storage device.

9. A memory card bridge for connecting a memory card to a memory card receiver of a memory card reading device; the bridge comprising:

(a) a card receiving section configured to receive and operatively connect to a pre-determined type of memory card for transmitting data from and to the memory card;

(b) a receiver insertion section connectable to the memory card receiver configured to operatively connect to a predetermined type of memory card receiver for transferring data between the memory card and the receiver, the predetermined type of receiver configured to operatively connect to the said predetermined type of memory card;

(c) the card receiving section is operatively connected to the receiver insertion section so that when the type of memory card is operatively inserted in the card receiving section and when the receiver insertion section is operatively connected to the receiver, data may be transmitted between the memory card and the receiver, and (d) the card receiving section comprises a housing with an opening dimensioned to receive the type of memory card for operative connection to the card receiving section for transmission of data between the memory card and the receiver wherein the housing comprises upper and lower planar members connected by opposed sides all dimensioned to provide a guide to ensure proper insertion of the memory card into the card receiving section and operative connection between the memory card and the card receiving section.

10. The memory card bridge of claim 9 wherein the receiver comprises an opening dimensioned to receive the type of memory card for operative connection of the receiver to a memory card of the type of memory card and wherein the card receiving section comprises an opening dimensioned to be identical to the opening of the receiver.

11. The memory card bridge of claim 10 wherein the type of memory card comprises a connector segment dimensioned to operatively connect to the opening of the receiver and wherein the receiver insertion section is dimensioned to be identical to the dimensions of the connector.

12. The memory card bridge of claim 9 wherein the housing length is at least 50% of the length of the type of memory card.

13. The memory card bridge of claim 9 wherein the housing length is approximately the length of the type of memory card such that when the memory card is operatively connected to the card receiving section the housing completely covers the memory card.

14. The memory card bridge of claim 9 wherein the type of memory card comprises a connector dimensioned to operatively connect to the receiver and wherein the receiver insertion section is dimensioned to be identical to the dimensions of the connector.

15. The memory card bridge of claim 9 wherein the card receiving section comprises a plurality of electrical contact connection members configured to match the electrical contact connectors of the type of memory card.

16. The memory card bridge of claim 15 wherein the receiver insertion section comprises a plurality of electrical contact connection members configured to match the electrical contact connectors of the receiver and wherein the plurality of electrical contact connectors of the receiver insertion section match the plurality of electrical contact connectors of the card receiving section.

17. The memory card bridge of claim 16 wherein each of the plurality of electrical contact connection members of the receiver insertion section are in electrical connection with a respective one of the plurality of contacts of the card receiving section.

18. The memory card bridge of claim 9 wherein the receiver insertion section comprises a plurality of electrical contact connection members configured to match the electrical contact connectors of the receiver.

19. A memory card reader, comprising:

(a) a frame member comprising a removable face plate, the face plate including a face plate opening dimensioned to receive a pre-determined type of memory card;

(b) a memory card receiver configured to operatively connect to the predetermined type of memory card connected to the frame and aligned with the face plate opening for receiving the predetermined type of memory card through the opening and for transmitting data between the predetermined type of memory card and the receiver, the receiver spaced from the face plate a pre-determined distance;

(c) a memory card bridge, comprising:

(i) a card receiving section configured to receive and operatively connect to the pre-determined type of memory card for transmitting data from and to the memory card;

(ii) a receiver insertion section connectable to the memory card receiver configured to operatively connect to the memory card receiver for transferring data between the memory card and the receiver;

(iii) the card receiving section is operatively connected to the receiver insertion section so that when the type of memory card is operatively inserted in the card receiving section and when the receiver insertion section is operatively connected to the receiver, data may be transmitted between the memory card and the receiver, (iv) the memory card bridge is dimensioned in length equivalent to the pre-determined distance so that when the receiver insertion section is operatively connected to the memory card receiver the opposite end of the memory card bridge is aligned on the side of the face plate facing the memory card receiver; and (d) wherein in normal operation with the memory card receiver is aligned with the face plate opening, the face plate is oriented with respect to the frame in a normal position which prevents the removal of the memory card bridge from the receiver and replacement with another like memory card bridge, and wherein such removal and replacement is permitted when the face plate is moved from its normal position.

20. The memory card reader of claim 19 wherein the receiver and face plate are oriented such that the outer end of the receiver is substantially co-planar with the face plate.

* * * * *